US009471928B2

(12) United States Patent
Fanelli et al.

(10) Patent No.: US 9,471,928 B2
(45) Date of Patent: Oct. 18, 2016

(54) SYSTEM AND METHOD FOR GENERATING TARGETED COMMUNICATIONS HAVING DIFFERENT CONTENT AND WITH PREFERENCES FOR COMMUNICATION MEDIA, CHANNEL, TIMING, FREQUENCY, AND SEQUENCES OF COMMUNICATIONS, USING AN INTEGRATED DATA REPOSITORY

(71) Applicant: Experian Marketing Solutions, Inc., Schaumburg, IL (US)

(72) Inventors: Marc Christian Fanelli, Kinnelon, NJ (US); Patricia Kay Gormley, Lincoln, NE (US); Kymberly Ann Kulle, Cincinnati, OH (US); Thomas G. Nocerino, Bethlehem, PA (US); Kaushik Sanyal, Jersey City, NJ (US)

(73) Assignee: Experian Marketing Solutions, Inc., Schaumburg, IL (US)

( * ) Notice: Subject to any disclaimer, the term of this patent is extended or adjusted under 35 U.S.C. 154(b) by 0 days.

(21) Appl. No.: 13/689,425

(22) Filed: Nov. 29, 2012

(65) Prior Publication Data
US 2013/0339093 A1    Dec. 19, 2013

Related U.S. Application Data

(63) Continuation of application No. 10/881,436, filed on Jun. 30, 2004, now Pat. No. 8,346,593.

(51) Int. Cl.
*G06Q 30/00* (2012.01)
*G06Q 30/02* (2012.01)

(52) U.S. Cl.
CPC .......... *G06Q 30/0202* (2013.01); *G06Q 30/02* (2013.01); *G06Q 30/0203* (2013.01); *G06Q 30/0204* (2013.01)

(58) Field of Classification Search
None
See application file for complete search history.

(56) References Cited

U.S. PATENT DOCUMENTS 5,890,140 A * 3/1999 Clark et al. ..................... 705/35
5,930,764 A * 7/1999 Melchione et al. ......... 705/7.29

(Continued)

OTHER PUBLICATIONS

Davis, Fred D., Richard P. Bagozzi, and Paul R. Warshaw. "User acceptance of computer technology: a comparison of two theoretical models." Management science 35.8 (1989): 982-1003.*

(Continued)

*Primary Examiner* — Gurkanwaljit Singh
(74) *Attorney, Agent, or Firm* — Nancy R. Gamburd; Gamburd Law Group LLC

(57) ABSTRACT

The present invention provides a system, method, software and data structure for independently predicting attitudinal and message responsiveness, using a plurality of attitudinal or other identification classifications and a plurality of message content or version classifications, for a selected population of a plurality of entities, such as individuals or households, represented in a data repository. The plurality of predictive attitudinal (or identification) classifications and plurality of predictive message content (ore version) classifications have been determined using a plurality of predictive models developed from a sample population and applied to a reference population represented in the data repository, such as attitudinal, behavioral, or demographic models. For each predictive attitudinal (or identification) classification, at least one predominant predictive message content or version classification is independently determined. The exemplary embodiments also provide, for each predictive attitudinal classification, corresponding information concerning predominant communication media (or channel) types, predominant communication timing, predominant communication frequency, and predominant communication sequencing.

17 Claims, 7 Drawing Sheets

(56) References Cited

U.S. PATENT DOCUMENTS

| | | | |
|---|---|---|---|
| 6,055,573 A * | 4/2000 | Gardenswartz et al. ..... 709/224 |
| 6,298,330 B1 * | 10/2001 | Gardenswartz et al. .. 705/14.25 |
| 7,013,285 B1 * | 3/2006 | Rebane ........................ 705/7.31 |
| 7,080,027 B2 * | 7/2006 | Luby et al. .................. 705/7.31 |
| 7,165,037 B2 * | 1/2007 | Lazarus et al. ............. 705/7.31 |
| 7,212,979 B1 * | 5/2007 | Matz et al ..................... 705/1.1 |
| 7,617,160 B1 * | 11/2009 | Grove et al. ................. 705/500 |
| 7,734,570 B2 * | 6/2010 | Bachman et al. |
| 7,783,534 B2 * | 8/2010 | Armstrong et al. ............ 705/29 |
| 7,957,991 B2 * | 6/2011 | Mikurak ...................... 705/7.11 |
| 8,032,409 B1 * | 10/2011 | Mikurak ...................... 705/14.39 |
| 2002/0004754 A1 * | 1/2002 | Gardenswartz et al. ....... 705/26 |
| 2002/0046105 A1 * | 4/2002 | Gardenswartz et al. ....... 705/14 |
| 2005/0091077 A1 * | 4/2005 | Reynolds .......................... 705/1 |
| 2006/0089914 A1 * | 4/2006 | Shiel et al. ..................... 705/52 |
| 2006/0178918 A1 * | 8/2006 | Mikurak ........................... 705/7 |
| 2008/0222127 A1 * | 9/2008 | Bergin ............................... 707/5 |
| 2009/0164293 A1 * | 6/2009 | Coley ............................... 705/9 |
| 2010/0191598 A1 * | 7/2010 | Toennis et al. ............ 705/14.36 |
| 2012/0011068 A1 * | 1/2012 | Dearing et al. ................. 705/50 |
| 2012/0016733 A1 * | 1/2012 | Belvin et al. .............. 705/14.41 |

OTHER PUBLICATIONS

Bagozzi, Richard P., and Youjae Yi. "On the evaluation of structural equation models." Journal of the academy of marketing science 16.1 (1988): 74-94.*

Warshaw, Paul R. "A New Model for Predicting Behavioral Intentions: an Alternative to Fishbein." Journal of Marketing Research (JMR) 17.2 (1980).*

* cited by examiner

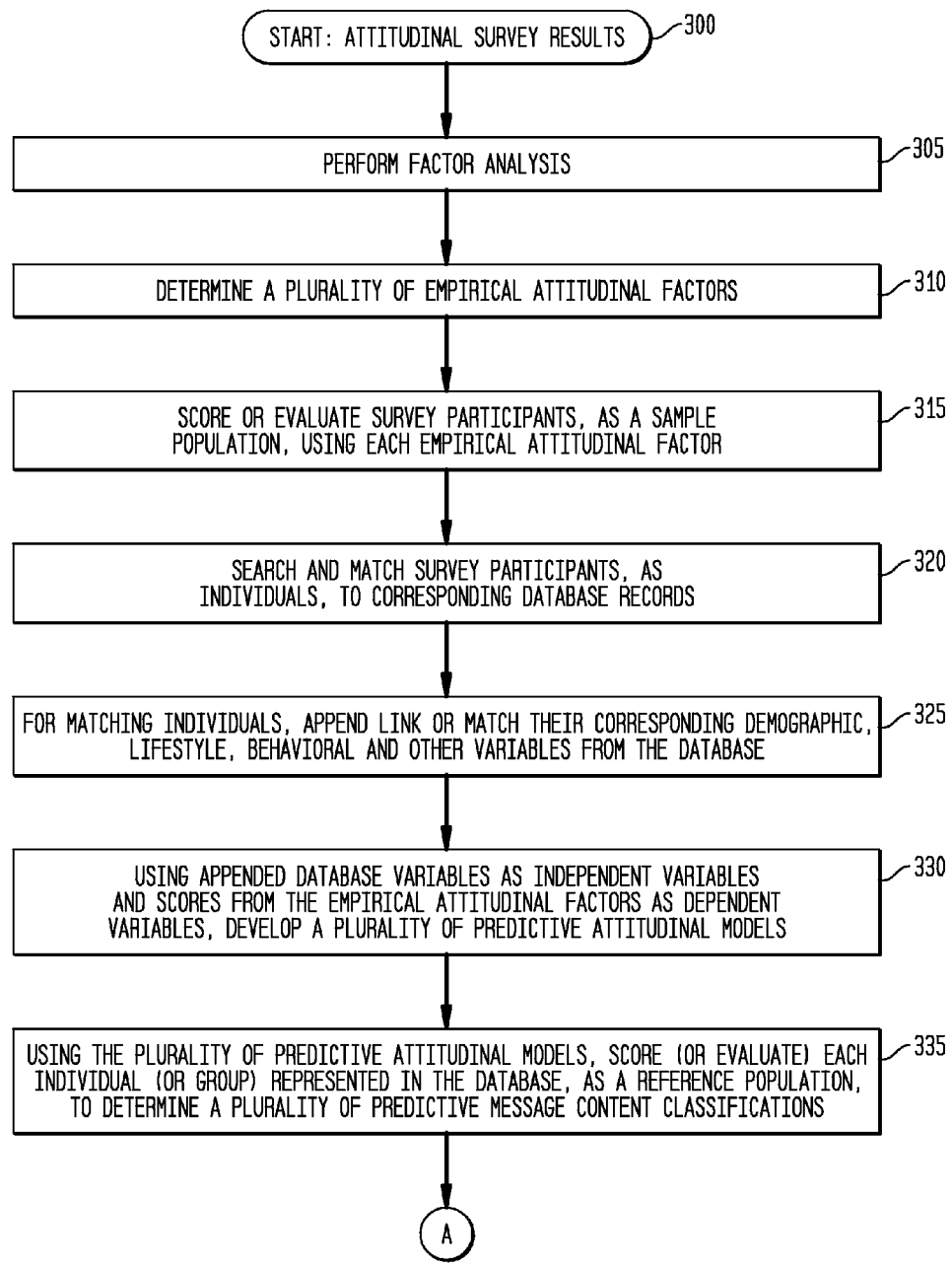

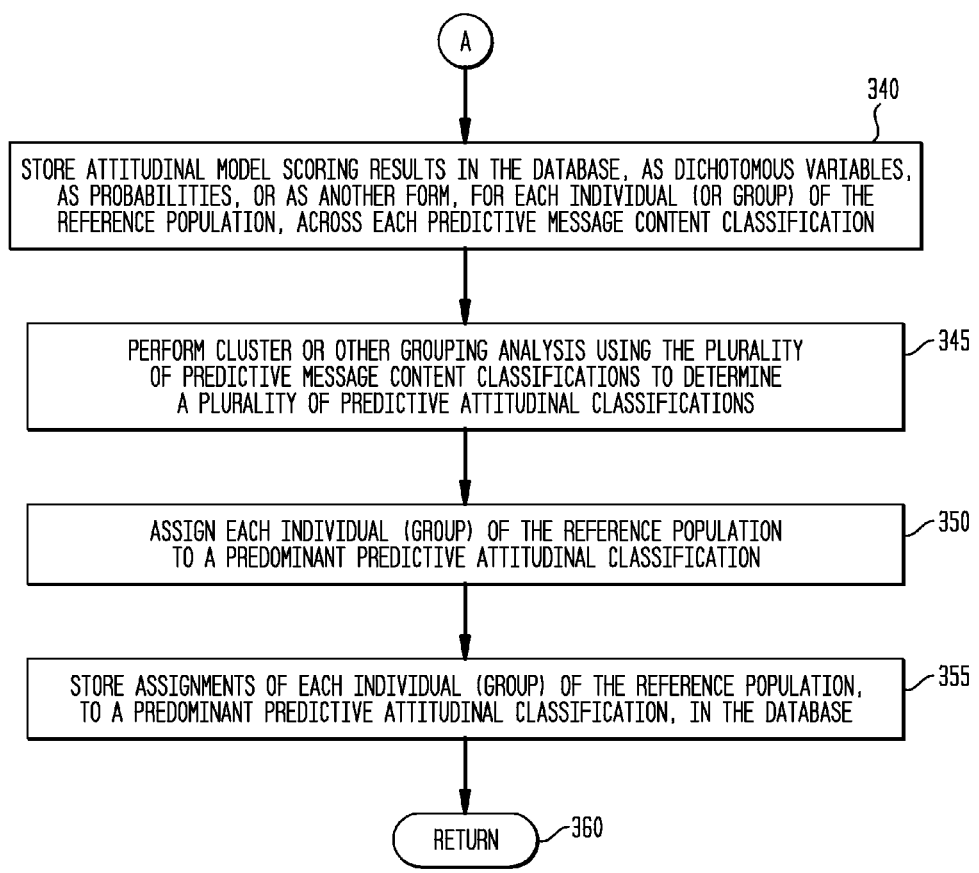

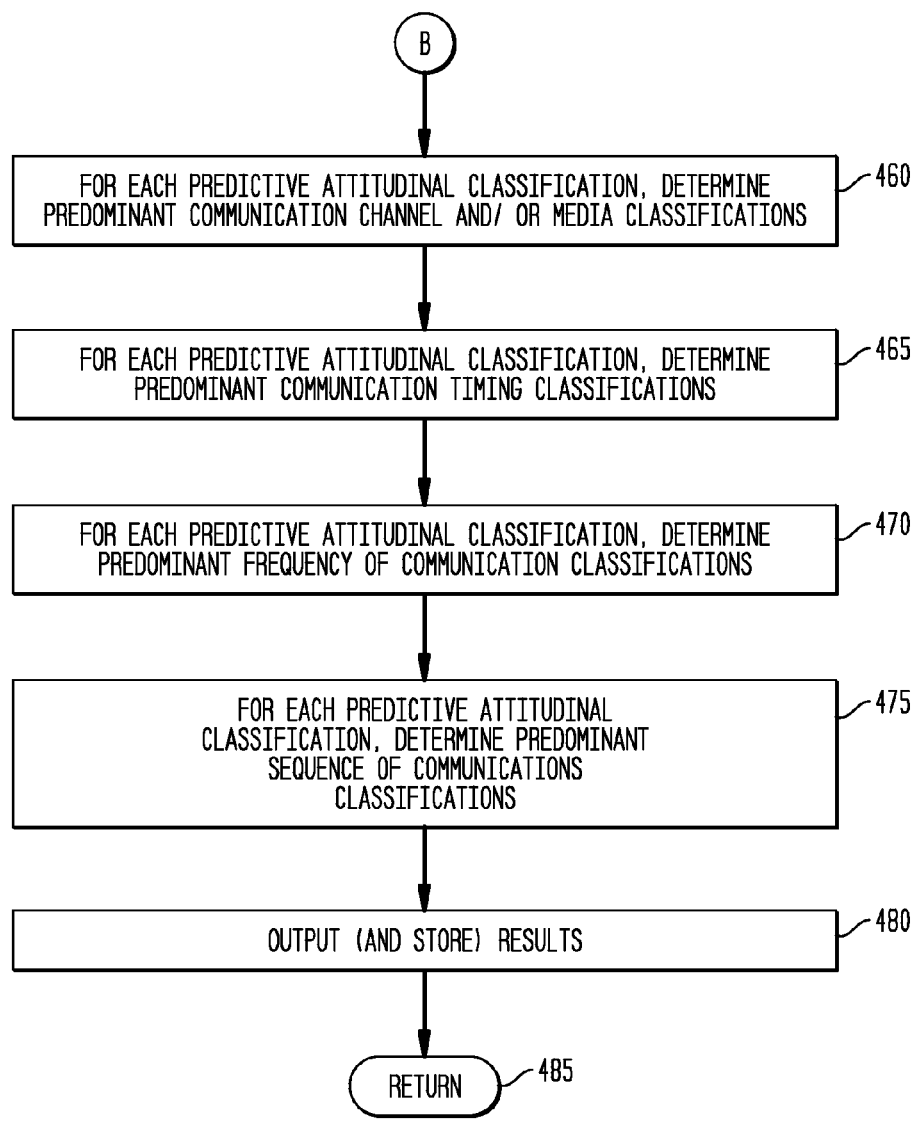

SYSTEM AND METHOD FOR GENERATING TARGETED COMMUNICATIONS HAVING DIFFERENT CONTENT AND WITH PREFERENCES FOR COMMUNICATION MEDIA, CHANNEL, TIMING, FREQUENCY, AND SEQUENCES OF COMMUNICATIONS, USING AN INTEGRATED DATA REPOSITORY

CROSS-REFERENCE TO A RELATED APPLICATION

This application is a continuation of and claims priority to co-pending U.S. patent application Ser. No. 10/881,436, filed Jun. 30, 2004, entitled "System, Method and Software for Prediction of Attitudinal and Message Responsiveness", inventors Marc Christian Fanelli et al., commonly assigned herewith, the entire contents of which are incorporated by reference herein with the same full force and effect as if set forth in their entirety herein, with priority claimed for all commonly disclosed subject matter.

FIELD OF THE INVENTION

The present invention relates, in general, to database management systems and, more particularly, to a system, method and software for independently predicting attitudinal and message responsiveness, and preferences for communication media, channel, timing, frequency, and sequences of communications, using an integrated data repository.

BACKGROUND OF THE INVENTION

Business and consumer records are typically contained in databases and other forms of data repositories. Typical databases may contain records such as demographic data, customer data, marketing data, name and address information, observed and self-reported lifestyle and other behavioral data, consumer data, public record information, realty and property tax information, summarized automotive statistics, summarized financial data, census data, and so on. Virtually any type of information may be contained in any such database. One such highly inclusive database, containing much of the above-mentioned types of data for approximately 98% of U.S. individuals and living units (households), is the Experian INSOURCE® database.

Various database applications have been directed to attempts to utilize the wide array of information contained in such databases for marketing and analytical purposes. For example, demographic data may be appended to customer records, to identify the demographic composition of a set of customers, followed by marketing directed toward people having similar demographic characteristics.

These database applications, in their various forms, attempt to understand and access distinct customer and prospect groups, and then send the right message to the right individual, household, living unit or other target audience. Typically, all of the individuals and/or households contained in the corresponding database are segmented into groups which share distinct demographic, lifestyle, and consumer behavior characteristics. In other applications, following such segmentation, consumer attitudes and motivations are assumed and attributed to those individuals/households within each such segment or cluster. The number of segments utilized varies widely by application.

In addition, in these various database marketing applications, consumer attitudes and preferred marketing message themes or types are generally assumed and assigned to a segment, without any independent empirical research and analysis. As a consequence, once a population is segmented, any further analysis of the population based on preferred messaging themes does not, in fact, add any additional, independent information, and merely reiterates the underlying message theme assumptions of any given segment.

The resulting data, moreover, may have a large degree of uncertainty, may or may not be accurate, and may or may not be actionable. For example, the attitudes, motivations and behaviors attributed or assigned to each segment may not be accurate and may not be based on factual, empirical research. Such attitudes, motivations and behaviors may or may not actually reflect representative attitudes found in a particular customer database.

The diminished accuracy of current marketing methods is further underscored by comparatively low response rates, such as 1-2% response from a target audience for direct mail marketing. Other methods and systems are required to appropriately target and motivate the remainder of the target audience, and to determine potentially new and underdeveloped target audiences. In addition, new methods and systems are required to maximize marketing returns, by not overly saturating the target audience with excessive and ineffective communications, and instead to appropriately communicate with the target audience using the audience's preferred methods and times of communication.

As a consequence, a need remains for a predictive methodology and system, for accurate prediction of attitudes, motivations and behaviors, which may be utilized for marketing applications. Such a method and system should be empirically-based, such as based on actual attitudinal, behavioral or demographic research and other information from a population sample, and further should provide accurate modeling to predict and extrapolate such attitudinal or other information to a larger or entire population. Such a method and system should provide information concerning preferred message themes or message content independently from any population grouping, segmentation or clustering process. In addition, such a method and system should be actionable, providing not only audience attitudinal information and preferred message content, but also preferred communication channel information or other preferred communication media, preferred frequency of communication or other contact, and communication timing information.

SUMMARY OF THE INVENTION

The present invention provides a system, method and software for independently predicting a plurality of first, message content classifications and a plurality of second, attitudinal classifications, for a selected population of individuals, households, living units or other groupings of people represented in a data repository, such as a selected population of customers or prospects represented in a database or data files. In addition, the system, method and software of the invention, depending on the selected embodiment, also determine preferences for communication channel or other media forms, communication timing, frequency of communication, and/or sequences of types of communication.

The illustrated, exemplary embodiments of the present invention are empirically-based, using actual attitudinal research and other information from a population sample. Other types of research or data may also be utilized, such as transactional data, demographic data, marketing research data, or other types of survey information. With this empirical basis, the invention provides accurate modeling to predict and extrapolate such attitudinal, behavioral, demographic or other information to a larger reference population, thereby providing for accurate prediction of attitudes, motivations and behaviors, which may be utilized for marketing applications, for example. The exemplary embodiments of the invention further provide information concerning preferred message themes or message content independently from any population grouping, segmentation or clustering process. In addition, the exemplary embodiments of the invention provide actionable results, providing not only audience attitudinal information and preferred message content, but also preferred communication channel information, communication media, communication frequency, and communication timing and sequencing information.

The power of the invention cannot be overstated. As indicated above, prior art methods have focused on finding "who", namely, those individuals or households to whom marketers should direct their communications. None of these prior art methods provide, independently of the selection of "who", determination of the "what" of the communication, such as preferred content or versions of marketing information. None of these prior art methods provide independent information on the "when" of the communication, such as the customer's or prospect's preferred time of day to receive communications. None of these prior art methods provide independent information on the "how" of the communication, such as the customer's or prospect's preferred medium or channel for communication, such as direct mail, telephone, electronic mail (email), broadcast media, print media, and so on. Lastly, none of these prior art methods provide independent information on the frequency (how often) and sequencing (ordering) of the communications, based on preferences, such as print media for a first number of times, followed by direct mail for a second number of times, followed by email, for example.

More specifically, in exemplary embodiments, the present invention provides a method, system and software for independently predicting both a plurality of first predictive classification, referred to as message content classifications, and a plurality of second predictive behavioral classifications, referred to as attitudinal or other behavioral classifications, for a selected population of a plurality of individuals, households, living units or other groupings of persons, as "entities", represented in a data repository. As used herein, any reference to "entity" or "entities" should be understood to mean and include any individual, household, living unit, group or potential grouping of one or more people, whether related or unrelated, individually or collectively, however defined or demarcated, such as a household, a living unit, a geographic unit, or any other grouping of individuals for whom or which data may be maintained, generally at a granular or atomic level, in a database.

In the exemplary embodiments, empirical attitudinal research and predictive attitudinal classifications are illustrated as examples, and should be understood to mean and include other forms of research and classifications, such as behavioral or demographic classifications formed from corresponding empirical research, such as corresponding behavioral or demographic survey research, for example.

The various exemplary method, system and software embodiments of the invention, perform the following:

First, for each entity (e.g., individual or household) of the plurality of entities of the selected population, appending from the data repository a corresponding predictive attitudinal classification of a plurality of predictive attitudinal classifications, and a corresponding plurality of predictive message content classifications, with the corresponding predictive attitudinal classification and corresponding plurality of predictive message content classifications having been determined using a plurality of predictive (attitudinal) models developed from a sample population and applied to a reference population represented in the data repository.

Second, for each predictive attitudinal classification of the plurality of predictive attitudinal classifications, determining a penetration index of the selected population compared to the reference population.

Third, for each predictive attitudinal classification of the plurality of predictive attitudinal classifications, independently determining at least one predominant predictive message content classification from the appended plurality of predictive message content classifications of the plurality of individuals of the selected population having the corresponding predictive attitudinal classification of the plurality of predictive attitudinal classifications.

In addition, depending upon the selected embodiment, for each entity (e.g., individual or household) of the plurality of entities of the selected population, the various embodiments optionally provide for appending from the data repository a corresponding predictive communication media (or other channel) classification of a plurality of predictive communication media classifications, a corresponding predictive communication timing classification of a plurality of predictive communication timing classifications, a corresponding predictive frequency of communication classification of a plurality of predictive communication frequency classifications, and a corresponding predictive sequence of communications of a plurality of predictive communication sequence classifications, with these classifications having been determined from information stored in the data repository.

Typically, the plurality of predictive communication media classifications comprises at least two of the following communication media (equivalently referred to as communication channels): electronic mail, internet, direct mail, telecommunication, broadcast media (such as radio, television, cable, satellite), video media, optical media (DVD, CD), print media (such as newspapers, magazines), electronic media (such as web sites and electronic forms of newspapers, magazines), and public display media (such as signage, billboards, multimedia displays). Depending upon the selected embodiment, the plurality of communication media and channel classifications may be more or less specific, such as further subdividing print and electronic media channels into newspaper, weekly magazines, monthly magazines, journals, business reports, and further into their print, internet, email or electronic versions. In addition, various forms of broadcast media may have any of a plurality of forms, such as cable, satellite, television and radio frequency transmission, internet, etc. Also typically, the plurality of predictive communication timing classifications comprises at least two of the following communication timing classifications: morning, afternoon, evening, night, weekday, weekend, any time (no preference), and none. The plurality of predictive communication frequency classifications typically comprises at least two of the following frequency of communication classifications: daily, weekly, biweekly, monthly, semi-monthly, bimonthly, annually, semi-annually, and none. Lastly, the plurality of communication sequences are highly varied and may include, for example, print communications, followed by electronic communications.

In the various embodiments, the plurality of predictive message content classifications are or have been determined by:

first, developing a plurality of empirical attitudinal factors based on a factor analysis of an attitudinal survey of a sample population;

second, using each empirical attitudinal factor of the plurality of empirical attitudinal factors, scoring each participant of the attitudinal survey to create a corresponding plurality of empirical attitudinal factor scores;

third, using a plurality of selected variables from the data repository as independent variables, and using the corresponding plurality of empirical attitudinal factor scores as dependent variables, performing a regression analysis to create the plurality of predictive attitudinal models;

fourth, using each predictive attitudinal model of the plurality of predictive attitudinal models, scoring the plurality of entities represented in the data repository, as the reference population, to create the plurality of predictive message content classifications; and fifth, independently determining the plurality of predictive attitudinal classifications by a cluster analysis of the plurality of predictive message content classifications of each entity of the plurality of entities represented in the data repository.

As indicated above, in lieu of or in addition to the attitudinal research and predictive attitudinal classifications, other types of research and corresponding classifications may also be formed, such as behavioral, demographic, and transactional.

The invention also provides for determining core, niche and growth attitudinal classifications, as follows:

determining one or more core attitudinal classifications by selecting, from the plurality of predictive attitudinal classifications, at least one predictive attitudinal classification having a comparatively greater (e.g., average or above average) penetration index and having a comparatively greater proportion of a selected population;

determining one or more niche attitudinal classifications by selecting, from the plurality of predictive attitudinal classifications, at least one predictive attitudinal classification having a comparatively greater penetration index and having a comparatively lesser proportion of the reference population; and determining one or more growth attitudinal classifications by selecting, from the plurality of predictive attitudinal classifications, at least one predictive attitudinal classification having a comparatively lesser (e.g., below average) penetration index and having a comparatively greater proportion of the reference population.

In yet another aspect of the invention, the exemplary embodiments provide a method and system for independently predicting communication responsiveness of a selected population of a plurality of entities represented in a data repository. The method comprises: (a) for each entity of the plurality of entities of the selected population, appending from the data repository a corresponding predictive identification classification of a plurality of predictive identification classifications, wherein the plurality of predictive identification classifications designate a plurality of entities according to a selected property; (b) for each entity of the plurality of entities of the selected population in a corresponding predictive identification classification, appending at least one corresponding predictive message version classification of a plurality of predictive message version classifications, the plurality of predictive identification classifications and the plurality of predictive message version classifications having been determined from a plurality of predictive models developed from a sample population and applied to a reference population represented in the data repository; and (c) for each predictive identification classification of the plurality of predictive identification classifications, independently determining at least one predominant predictive message version classification from the corresponding, appended predictive message version classifications of the plurality of entities of the selected population of the predictive identification classification. The selected property is derived from at least one of the following: attitudinal characteristics, behavioral characteristics, demographic characteristics, geographic characteristics, financial characteristics, or transactional characteristics.

In yet another aspect of the invention, the exemplary embodiments provide a data structure for independently predicting communication responsiveness of a selected population of a plurality of entities represented in a data repository. Such a data structure may be stored in a database, transmitted electronically, or stored in a tangible medium. The data structure comprises: a first field having a plurality of predictive identification classifications, wherein the plurality of predictive identification classifications designate a plurality of entities according to a selected property; and a second field having, for each predictive identification classification of the first field, at least one predominant predictive message version classification of a plurality of predictive message version classifications, the plurality of predictive identification classifications and the plurality of predictive message version classifications having been determined from a plurality of predictive models developed from a sample population and applied to a reference population represented in the data repository.

The data structure may also include a third field having, for each predictive identification classification of the first field, at least one predominant predictive communication media classification of a plurality of predictive communication media classifications; a fourth field having, for each predictive identification classification of the first field, at least one predominant predictive communication timing classification of a plurality of predictive communication timing classifications; a fifth field having, for each predictive identification classification of the first field, at least one predominant predictive communication frequency classification of a plurality of predictive communication frequency classifications; a sixth field having, for each predictive identification classification of the first field, at least one predominant predictive communication sequencing classification of a plurality of predictive communication sequencing classifications; and a seventh field having a penetration index for each predictive identification classification of the plurality of predictive identification classifications. As indicated above, the selected property is derived from at least one of the following: attitudinal characteristics, behavioral characteristics, demographic characteristics, geographic characteristics, financial characteristics, or transactional characteristics.

In yet another aspect of the invention, the exemplary embodiments provide a method for independently predicting communication media responsiveness of a selected population of a plurality of entities represented in a data repository, comprising: (a) for each entity of the plurality of entities of the selected population, appending from the data repository a corresponding predictive identification classification of a plurality of predictive identification classifications, wherein the plurality of predictive identification classifications designate a plurality of entities according to a selected property; and (b) for each predictive identification classification of the plurality of predictive identification classifications, independently determining at least one predominant predictive communication media classification of a plurality of predictive communication media classifications.

In other embodiments, instead of step (b) above, the exemplary method provides for each predictive identification classification of the plurality of predictive identification classifications, independently determining at least one predominant predictive communication timing classification of a plurality of predictive communication timing classifications, or for independently determining at least one predominant predictive communication frequency classification of a plurality of predictive communication frequency classifications.

These and additional embodiments are discussed in greater detail below. Numerous other advantages and features of the present invention will become readily apparent from the following detailed description of the invention and the embodiments thereof, from the claims and from the accompanying drawings.

BRIEF DESCRIPTION OF THE DRAWINGS

The objects, features and advantages of the present invention will be more readily appreciated upon reference to the following disclosure when considered in conjunction with the accompanying drawings and examples which form a portion of the specification, in which:

FIG. 3 (divided into FIGS. 3A and 3B and collectively referred to as FIG. 3), is a flow diagram illustrating an exemplary method for determination of predictive attitudinal classifications and predictive message content classifications using a data repository in accordance with the present invention.

DETAILED DESCRIPTION OF THE INVENTION

Figure 1:
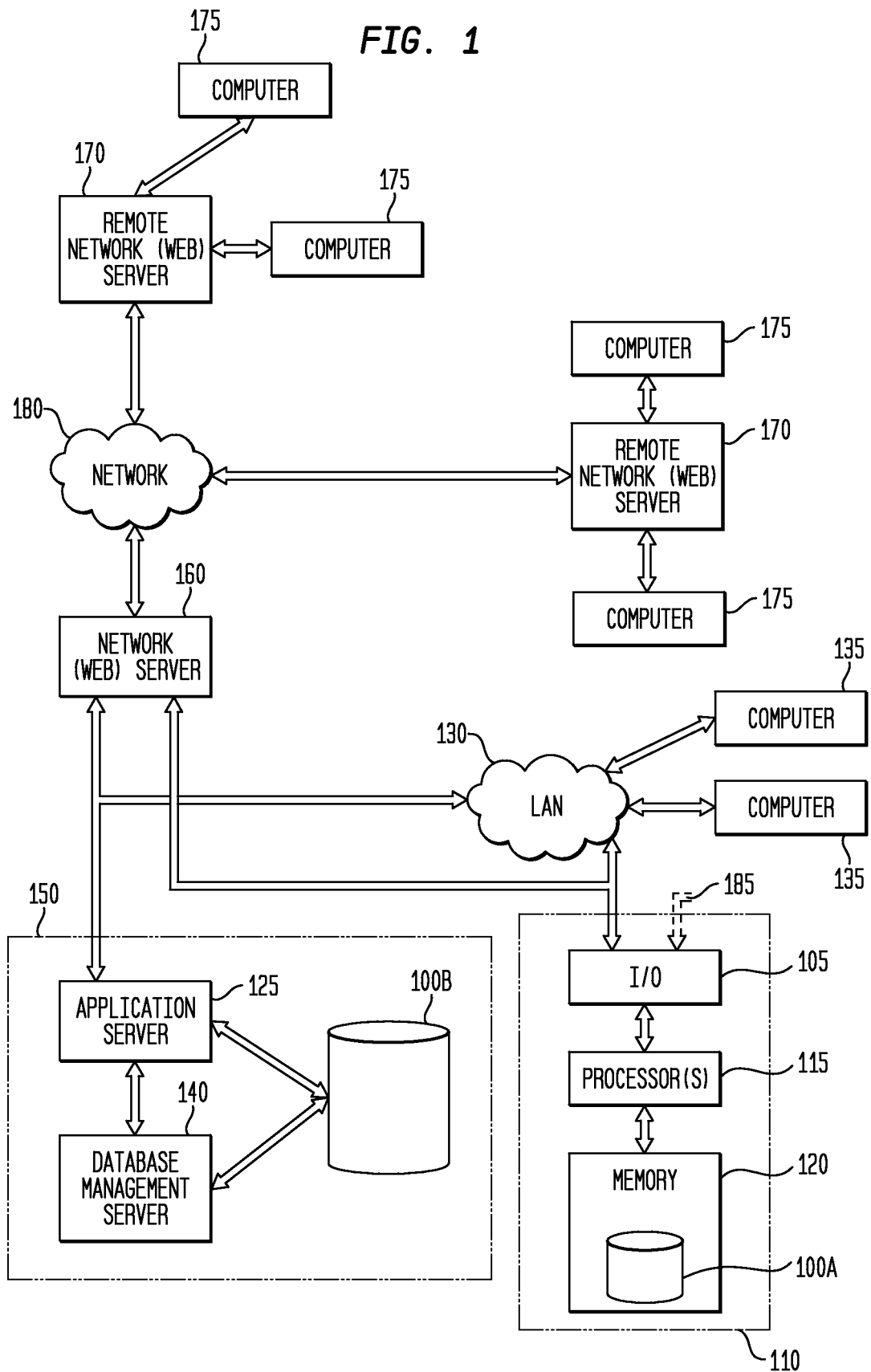
FIG. 1 is a block diagram illustrating first and second exemplary system embodiments in accordance with the present invention.

While the present invention is susceptible of embodiment in many different forms, there are shown in the drawings and will be described herein in detail specific examples and embodiments thereof, with the understanding that the present disclosure is to be considered as an exemplification of the principles of the invention and is not intended to limit the invention to the specific examples and embodiments illustrated.

As indicated above, the present invention provides a system, method and software for independently predicting a plurality of attitudinal classifications and a plurality of message content classifications, for a selected population of individuals, households or other living units ("entities") represented in a data repository, such as a database. The embodiments of the present invention provide a predictive methodology, system and software, for accurate prediction of attitudes, motivations and behaviors, which may be utilized for marketing, research, assessment, and other applications. The embodiments of the invention are empirically-based upon actual attitudinal research and other information from a population sample, and provide accurate modeling to predict and extrapolate such attitudinal information to a larger reference population. The embodiments of the invention further provide information concerning preferred message themes or message content independently from any population grouping, segmentation or clustering process. In addition, the embodiments of the invention provide actionable results, providing not only audience attitudinal information and preferred message content, but also preferred communication and media channel information, communication frequency, and communication timing and sequence information.

FIG. 1 is a block diagram illustrating first exemplary system embodiment 110 and second exemplary system embodiment 150 in accordance with the present invention. As illustrated in FIG. 1, the first exemplary system embodiment 110 is a computer system embodiment (e.g., a mainframe computer), comprising an input and output (I/O) interface 105, one or more processors 115, and a memory 120 storing a database (or data repository) 100A. The memory 120 may be external, such as an external magnetic disk, tape, or optical drive. The second system 150, such as an open or network system, comprises a data repository (or database) 100B (also embodied in a form of memory, discussed below), a database management server 140, and/or an application server 125. A "data repository", "database", and "data warehouse", as used herein, are considered interchangeable, and may be relational, object-oriented, object-relational, or use files or flat files, or any combinations of the above. Both database 100A and 100B are instantiations of a database 100, discussed in greater detail below.

In the exemplary embodiments of system 150, the database management server 140 and the application server 125 may be implemented together, such as implemented within the application server 125. Either or both of the database management server 140 and the application server 125 are connected or coupled (or couplable) to the data repository (database) 100B, for full duplex communication, such as for database queries, database file or record transfers, database updates, and other forms of database communication. In the second system embodiment 150, the database management server 140 and/or the application server 125 perform the methodology of the invention utilizing a correspondingly programmed or configured processor as discussed below (not separately illustrated), such as a processor 115 illustrated for system 110, in conjunction with a database 100 (such as database 100B).

Typically, the databases 100A and 100B are ODBC-compliant (Open Database Connectivity), although this is not required for the present invention. The first system 110 and second system 150 may also be coupled to or may be part of a local area network ("LAN") 130 or, not separately illustrated, a wide area network ("WAN"), such as for full duplex communication with a plurality of computers (or other terminals) 135, also for database queries, database file or record transfers, database updates, and other forms of database communication. The LAN 130 communication capability provides for the first system 110 and second system 150 to be accessible for local access to the databases 100A and 100B, such as for large file transfers or other batch processing, discussed in greater detail below. In addition, the first system 110 may also be directly accessible (185), such as for loading of records (e.g., magnetic tape records or other media) for batch processing.

The first system 110 and second system 150 may also be included within or coupled to a larger data communication network 180, through network (or web) server 160, for full duplex communication with remote devices, such as a remote Internet or other network server 170 and remote computer (or other terminal) 175. Such remote communication capability provides for the first system 110 and second system 150 to be accessible for on-line functionality, discussed in greater detail below, such as for web-based access, using any of the prior art protocols, such as hypertext transfer protocol (HTTP) or other Internet Protocol ("IP") forms of communication for data, voice or multimedia.

The data repository (or database) 100, illustrated as databases 100A and 100B, may be embodied in any number of forms, including within any data storage medium, memory device or other storage device, such as a magnetic hard drive, an optical drive, a magnetic disk or tape drive, other machine-readable storage or memory media such as a floppy disk, a CDROM, a CD-RW, DVD or other optical memory, a memory integrated circuit ("IC"), or memory portion of an integrated circuit (such as the resident memory within a processor IC), including without limitation RAM, FLASH, DRAM, SRAM, MRAM, FeRAM, ROM, EPROM or EPROM, or any other type of memory, storage medium, or data storage apparatus or circuit, which is known or which becomes known, depending upon the selected embodiment.

In the first system 110, the I/O interface may be implemented as known or may become known in the art. The first system 110 and second system 150 further include one or more processors, such as processor 115 illustrated for first system 110. As the term processor is used herein, these implementations may include use of a single integrated circuit ("IC"), or may include use of a plurality of integrated circuits or other components connected, arranged or grouped together, such as microprocessors, digital signal processors ("DSPs"), custom ICs, application specific integrated circuits ("ASICs"), field programmable gate arrays ("FPGAs"), adaptive computing ICs, associated memory (such as RAM and ROM), and other ICs and components. As a consequence, as used herein, the term processor should be understood to equivalently mean and include a single IC, or arrangement of custom ICs, ASICs, processors, microprocessors, controllers, FPGAs, adaptive computing ICs, or some other grouping of integrated circuits which perform the functions discussed below, with associated memory, such as microprocessor memory or additional RAM, DRAM, SRAM, MRAM, ROM, EPROM or EPROM. A processor (such as processor 115), with its associated memory, may be adapted or configured (via programming, FPGA interconnection, or hard-wiring) to perform the methodology of the invention, as discussed above and as further discussed below. For example, the methodology may be programmed and stored, in a processor with its associated memory (and/or memory 120) and other equivalent components, as a set of program instructions (or equivalent configuration or other program) for subsequent execution when the processor is operative (i.e., powered on and functioning). Equivalently, when the first system 110 and second system 150 may implemented in whole or part as FPGAs, custom ICs and/or ASICs, the FPGAs, custom ICs or ASICs also may be designed, configured and/or hard-wired to implement the methodology of the invention. For example, the first system 110 and second system 150 may implemented as an arrangement of microprocessors, DSPs and/or ASICs, collectively referred to as a "processor", which are respectively programmed, designed, adapted or configured to implement the methodology of the invention, in conjunction with a database 100.

The application server 125, database management server 140, and the system 110 may be implemented using any form of server, computer or other computational device as known or may become known in the art, such as a server or other computing device having a processor, microprocessor, controller, digital signal processor ("DSP"), adaptive computing circuit, or other integrated circuit programmed or configured to perform the methodology of the present invention, such as a processor 115, as discussed in greater detail below.

Figure 2:
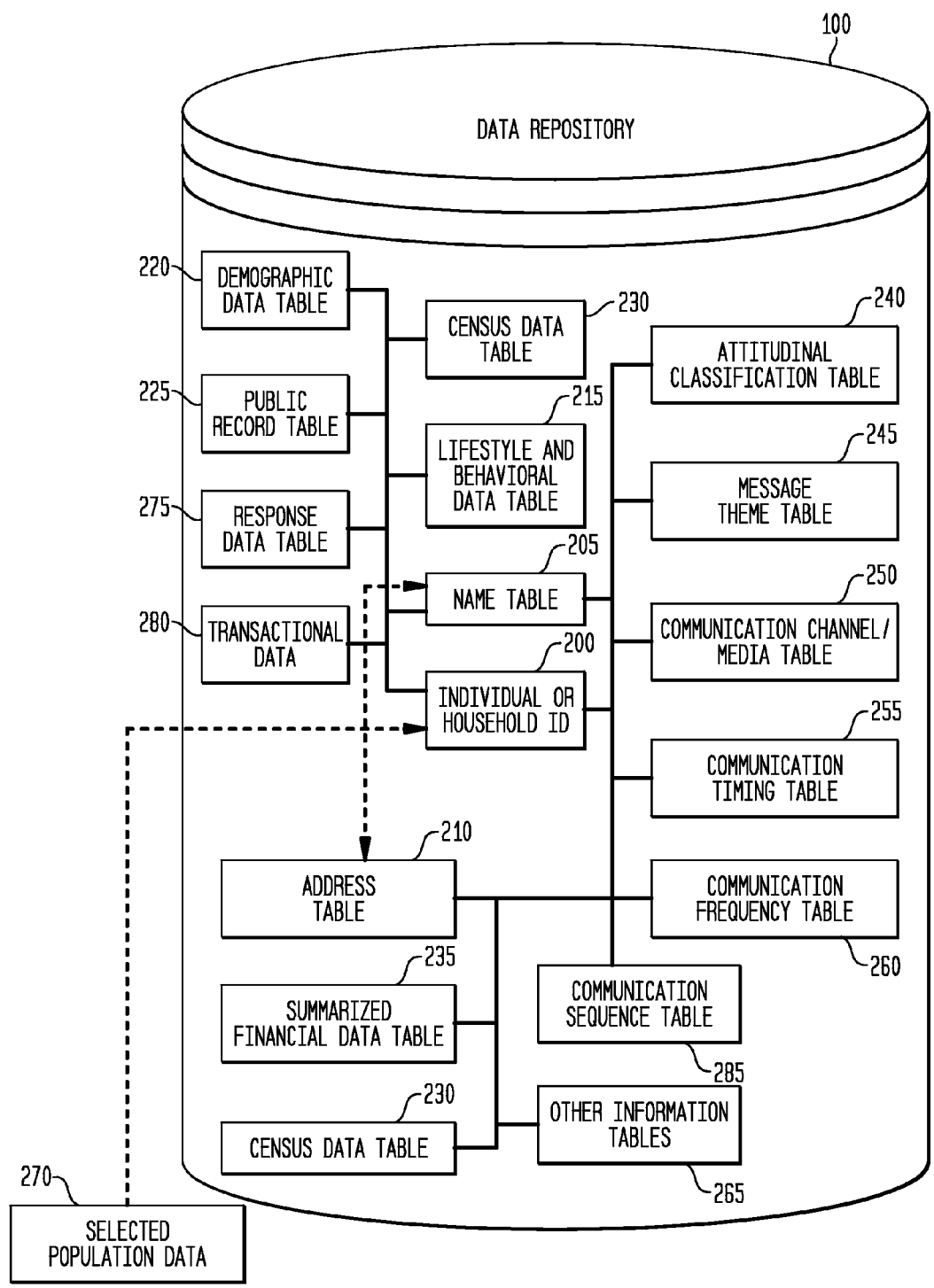
FIG. 2 is a block diagram illustrating an exemplary integrated data repository in accordance with the present invention.

FIG. 2 is a block diagram illustrating an exemplary data repository (or database) 100 in accordance with the present invention. As mentioned above, "data repository" as used herein, is considered interchangeable with "database", and may be relational, object-oriented, or object-relational, or utilize any other database structure, in accordance with a selected embodiment. The database 100 may be integrated, namely, that the information resides within a singular, co-located or otherwise centralized database structure or schema, or may be a distributed database, with information distributed between and among a plurality of databases, some of which may be remotely located from the other databases. From another point of view, the database 100 may be considered integrated in that a plurality of different tables or types of tables, objects or relations are included within the database 100, such as including an attitudinal classification table 240 with the other illustrated tables discussed below. While generally not included within the database 100 (as potentially private client data), optionally one or more copies of a selected population data (file, table or database) 270, such as a client customer databases, client customer flat files, or client master databases, may also be utilized. (Use of any type of data repository, whether an integrated database, a non-integrated database, or any otherwise distributed or non-distributed database structures or schemas, are within the scope of the present invention. While referred to as tables, it should be understood that the tables illustrated in the database 100 of FIG. 2 are to be construed broadly, to mean and include relations, objects, object relations, multi-dimensional relations, cubes, flat files, or other similar or equivalent database constructs.) In addition, while a plurality of relations (or connections) between and among the various tables are illustrated in FIG. 2, it should be understood that in any selected embodiment, a greater or fewer number of relations, connections, cross-references, keys, or indices may be utilized, all within the scope of the present invention.

The database 100 generally includes, for example, a name table 205, an address table 210, a lifestyle and behavioral data table 215, and a demographic data table 220, and depending upon the selected embodiment, may also include a public record table 225, a census data table 230, a summarized financial data table 235, and other information tables 265. In various embodiments, the name table 205 and address table 210 may be combined as a single table. In the exemplary embodiments, the database 100 further includes an attitudinal (or behavioral) classification table 240, a message theme table 245, a communication media (or channel) table 250, a communication timing table 255, a communication frequency table 260, a communication sequence table 285, a response data table 275, and a transactional data table 280, as discussed in greater detail below. While illustrated as separate tables or relations, it should be understood that the information contained in such tables may be contained or distributed between or among any number of tables or relations, depending upon any applicable or selected schema or other database 100 structure, in any number of equivalent ways, any and all of which being within the scope of the present invention. The data repository 100 is generally included within a first system 110 and/or second system 150, and respectively accessed through the I/O 105 and processor 115, or an application server 125 or database management server 140, discussed above.

The name table 205 contains all individual, consumer, household, living unit, group or other entity names, in various forms, variations, abbreviations, and so on, and is also utilized for searching and matching processes, as discussed below. The address table 210 contains all addresses of individuals, households, living units, groups or other entities which will be utilized for searching and matching processes, as discussed below. In the exemplary embodiment, the lifestyle and behavioral data table 215 contains lifestyle and behavioral information for individuals, households, living units, or other groups or consumers, as "entities", such as purchase behavior, activity data, and any self-reported data. The demographic data table 220 contains demographic information and possibly geodemographic information for consumers and other individuals, households, living units, or other entities, such as age, gender, race, religion, household composition, income levels, career choice, etc. The public record table 225 contains information available in public records, such as vehicle ownership records, driving records, property ownership records, public proceeding records, secured transaction records, and so on. The census data table 230 contains census information, typically available through a government agency. The summarized financial data table 235, when included in database 100, typically includes summaries of financial information generally for individuals or households in a given geographic region (e.g., by postal code), and could possibly also include bank account information, investment information, securities information, and credit or other private information, when available and to the extent allowable under any applicable regulations or laws.

The transactional data table 280 typically contains information concerning purchase history or other transaction history of the various entities. The response data table 275 contains information typically related to transactional data, such as for purchases made in response to a particular communications, such as in response to a catalogue, direct mail, or a magazine advertisement. The transactional data table 280 and the response data table 275, for example, may be based upon data from particular clients or groups of clients. The information contained in the lifestyle and behavioral data table 215, the demographic data table 220, the public record table 225, the census data table 230, and the summarized financial data table 235, other information tables 265, and any other available tables, depending upon the selected embodiment, are utilized in the creation of independent variables for the predictive attitudinal (or behavioral) modeling discussed below. The selected population data 270, which may be in any of various forms such as a table, a file, a flat file, a relation, a database, or another data schema, such as a copy of a selected customer database, contains names or names and addresses of individuals, households, living units, other groups or entities, such as customers or any other selected or designated population, and is utilized to provide predictive attitudinal marketing information for the selected population, as discussed in greater detail below. Also optionally included within database 100 are other information tables 265, such as for other demographic information, credit information, and fraud information, when available or authorized.

The attitudinal classification table 240, the message theme table 245, the communication channel table 250, the communication timing table 255, the communication frequency table 260, and the communication sequence table 285, are generally created, populated or segregated based upon the predictive attitudinal (or behavioral) modeling discussed below with reference to FIG. 3.

Depending upon the selected database 100 embodiment, a table or index (relation or look-up table) 200 of identifiers or identifications ("IDs") of a plurality of individuals, consumers, households, living units, other groups or entities, may be included within the database 100. The identifiers are typically persistent, with every entity assigned at least one ID. In the exemplary embodiments, the ID table 200 also provides relations, links or cross-references to a plurality of other relations or tables, such as, for example, the name table 205, the address table 210, the lifestyle and behavioral data table 215, the demographic data table 220, the public record table 225, the census data table 230, the summarized financial data table 235, the attitudinal classification table 240, the message theme table 245, the communication channel table 250, the communication timing table 255, the communication frequency table 260, the communication sequence table 285, and the other information tables 265. The ID table 200 may also provide relations, links or cross-references to selected population data (file, table or database) 270, depending upon the selected embodiment and the form of the data. The ID table 200 may be utilized in the searching and matching processes discussed below, and for other database applications, such as updating.

FIG. 3 is a flow diagram illustrating an exemplary method for determination of first predictive (attitudinal) classifications and second predictive (message content) classifications using a data repository in accordance with the present invention. As indicated above, in accordance with the exemplary embodiments, such first predictive classifications are attitudinal and derived using empirical attitudinal research; in other embodiments, the first predictive classifications may be behavioral, demographic, or any combination thereof, and derived from corresponding empirical research, such as behavioral or demographic survey research. The second predictive classifications are determined independently, and in the exemplary embodiments, provide message content or message theme classifications, which are subsequently utilized to determine the "what" of a marketing or educational communication, for example.

The method begins, start step 300, with results of one or more attitudinal (or behavioral) surveys of individuals, as consumers or as members of a living unit (household). As mentioned above, as used herein, "entity" or "entities" should be understood to mean and include any individual person, household, living unit, group or potential grouping of one or more people, whether related or unrelated, individually or collectively, such as a single individual, a household, a living unit, a geographic unit, or any other grouping of individuals for which data may be maintained, generally at a granular or atomic level in a database. For example, various databases may be maintained in which information is stored and available at an individual level, for individual persons and, in many cases, also maintained at a less granular level of living units (households), while in other cases, also within the scope of the present invention, information may be stored and available in a database only at a household level, with the predicted attitudinal and messaging classifications then pertaining to corresponding households (as a larger grouping of one or more individuals). In other cases, an individual residing at a first location may also be considered to be part of a living unit at a second location, such as a student residing in a college dormitory being considered part of a family household residing at a different location. All such variations are within the scope of the present invention and, for ease of reference, any references to an entity or entities means and includes any individual, person, or grouping or collection of persons, however such a grouping may be defined or demarcated.

In the exemplary embodiments, an empirical modeling process is performed in which selected questions from a survey are utilized for obtaining information pertinent to consumer purchasing, behaviors, and attitudes (which also may be considered to include various behavioral and demographic components). Survey questions, data and results are available from a wide variety of vendors, publications, and other sources. Survey questions may also be determined based upon the goals of the modeling and classification processes. The survey may be conducted and results obtained in any of various forms, such as via telephone, written survey, email survey, mail survey, internet survey, personal interview, etc. The selected questions from the survey are then subjected to a factor analysis, step 305, to statistically determine which questions are highly related to or among other survey questions, to what degree, and to isolate the significant questions and determine corresponding factors, step 510, with a selected group of highly related survey questions forming a selected, corresponding factor. This factor analysis may also be an iterative process in selected embodiments. The resulting plurality of empirical attitudinal factors identify attitudes, behaviors and motivations of the survey participants, and identify the significant corresponding survey questions. The plurality of empirical attitudinal factors which are selected depend upon the selected purposes of the classifications discussed below, such as marketing analyses, for example, and are also dependent upon the selected purposes of the survey (as are the resulting attitudinal and message content classifications, discussed below), and the cultural, sociological, demographic, and other characteristics of the sample population of the survey.

In an exemplary embodiment, a plurality of empirical attitudinal factors were developed as a result of the factor analysis and empirical attitudinal model determinations of steps 305 and 310. Exemplary factors for marketing purposes include, for example, consumer brand loyalty, impulse buying behavior, incentive driven behavior, and so on. Innumerable other factors and corresponding questions will be apparent to those of skill in the art, for other behavioral or demographic modeling, for example. Corresponding exemplary statements are illustrated below, to which a sample population was asked to agree or disagree, on a varying scale, from highly agree, somewhat agree, neutral, somewhat disagree, and highly disagree, resulting in an equivalent question format. The sample questions are exemplary, for purposes of illustration only, and any resulting set of attitudinal, behavioral or demographic models (discussed below) will be empirically determined based upon the purpose of the research survey, the selected survey questions and results, the survey population and culture, followed by factor analysis. Additional survey questions may also be utilized to expand the attitudinal factors utilized. Exemplary statements, utilized in a representative survey of the present invention, include, for example:

If a product is made by a company I trust, I'll buy it even if it is slightly more expensive.

I am willing to pay more for a product that is environmentally safe.

I like to shop around before making a purchase.

I'm always one of the first of my friends to try new products or services.

I prefer products that offer the latest in new technology.

If I really want something I will buy it on credit rather than wait.

I'd rather receive a sample of a product than a price-off coupon.

Following development of the plurality of empirical attitudinal factors of steps 305 and 310, all of the survey participants, as a sample population, are scored across each of the empirical attitudinal factors, step 315. For example, various survey participants may have indicated various levels of agreement (or disagreement) with the survey questions of a particular attitudinal factor, and as such, would be scored high (or low) for that particular attitudinal factor. The scoring process may also be computed in probabilistic terms, as a probability of exhibiting a particular attitude. As a consequence, in the exemplary embodiment, each survey participant was scored across the plurality of empirical attitudinal factors. Also for example, various survey participants may have similar scores across a plurality of empirical attitudinal factors, such as high scores for the same first factor, and low scores for the same second factor.

Following scoring of the survey participants across each of the empirical (attitudinal) factors in step 315, records in the database 100 pertaining to the survey participants, as individuals (or entities such as living units), are searched, and the survey participants are matched with their corresponding records within the database 100, step 320, generally utilizing the name table 205 and address table 210. For all entities such as individuals, households, living units, or other groups having matching records (i.e., matching individuals/households), demographic, lifestyle, behavioral, and other variables (from the database 100) are appended or linked to each (matching) survey participant, step 325, such as variables from the lifestyle and behavioral data table 215, the demographic data table 220, the public record table 225, the census data table 230, the summarized financial data table 235, the transactional data table 280, and the response data table 275, for example. In the exemplary embodiment, the Experian INSOURCE® database, as previously described, was utilized as the database 100. Using the appended database variables as independent variables, and using the empirical attitudinal factor scores as dependent variables, a predictive attitudinal model (or, equivalently, an attitudinally predictive model) is developed for each empirical attitudinal factor, step 330, thereby generating a corresponding plurality of predictive attitudinal models, one for each empirical attitudinal factor. In the exemplary embodiment, a logistic regression analysis is performed, to identify the database variables (as independent variables) which are statistically significant predictors of the attitude of the corresponding empirical attitudinal factor. Other statistical methods, such as multiple linear regression analysis, other forms of regression analysis, and other forms of modeling and statistical analysis, are also considered equivalent and within the scope of the present invention. Selection of given database variables is also a function of the availability of such variables within the database 100, namely, any given database may or may not include variables available in other databases. Not separately illustrated in step 330, the plurality of attitudinally predictive models may also be validated, such as by using a "holdout" (or separate) sample from the survey results.

Using the plurality of predictive attitudinal models of step 330, all or most database entities (or members), namely, all or most individuals, consumers, households, living units, or other groups contained in the database (i.e., contained in the database by having representative information in the database 100), are scored (or otherwise evaluated) across each of the plurality of predictive attitudinal models, step 335. Having been scored/evaluated, these entities (e.g., individuals or households) then form a reference population, utilized for comparative purposes discussed below. The results from each such entity (individual or group) being scored or evaluated based on each of the predictive attitudinal models, in step 335, then form or represent (or otherwise generate or determine) a corresponding plurality of predictive message content classifications, also referred to as predictive message theme classifications, for each such entity (individual or group) represented in the database 100. More specifically, using the plurality of predictive attitudinal models, each entity (individual, household, living unit, or other group) represented in the database 100 is predicted to have a corresponding probability of belonging in or to a classification associated with a particular attitude/behavior/demographic of interest, in which entities (individuals, households, living units, or other groups) exhibiting that attitude/behavior/demographic are generally responsive, receptive, attentive, conducive to or motivated by messages or other communications having a particular content or theme. Such content or themes, for example, to which individuals or groups may be receptive, may be matched, correlated or derived from various information sources, such as information contained in the lifestyle and behavioral data table 215, the response data table 275, and the transactional data table 280. As a consequence, the results from the evaluations using the predictive attitude/behavior/demographic models provide or form the corresponding predictive message content classifications for each entity (individual, household, living unit, or other group) of the reference population.

These classifications are referred to as predictive message content classifications (or message theme classifications) because, as discussed below, they are utilized to predict the message content or message themes to which individuals, households, living units, or other groups within that classification are likely to be receptive or responsive. As indicated above, the actual result of the scoring may be a probability of exhibiting the attitude in question, or may be a number or percentile which can be equivalently translated into such a probability. In the exemplary embodiment, the probability scores were further classified into nine tiers, which were then further utilized to create dichotomous variables in order to classify the entity (individual or group) as either exhibiting the attitude of interest or not exhibiting the attitude of interest. For each such entity (individual or group), the results of step 335, namely, the scores for each of the predictive attitudinal models and/or each of the resulting predictive message content classifications, are stored in the database, step 340, such as in message theme table or relation 245.

For example, using the scores or evaluations from the plurality of predictive attitudinal models for individual (or group) "A", records may be stored indicating that "A" has a high probability level of belonging to predictive message content classifications "X", "Y", and "Z", and a low probability level of belonging to each of the remaining predictive message content classifications. Alternatively and equivalently, records for individual (or group) "A" may be stored indicating that "A" has certain scores from the evaluations under each of the predictive attitudinal models, and belongs to predictive message content classifications "X", "Y", and "Z" (with dichotomous variables of "1"), and does not belong to each of the remaining predictive message content classifications (with dichotomous variables of "0"). As a consequence, depending upon the selected embodiment, all or most entities represented in the database 100 have associated scores for each of the plurality of predictive attitudinal models and, correspondingly, a membership (or no membership), or a degree or probability of membership, in each of the corresponding plurality of predictive message content (or theme) classifications.

It should be noted that in the exemplary embodiments, the empirical attitudinal factors and predictive message content classifications have a one-to-one correspondence, and may be very similar. In other embodiments, there may be more or fewer predictive message content classifications compared to empirical attitudinal factors. As indicated above, the empirical attitudinal factors are based on the factor analysis of the survey questions from the sample population and are utilized to develop the predictive attitude/behavior/demographic models incorporating the database variables. The predictive attitude/behavior/demographic models derived from the empirical analysis of the sample population are then extended into the database population, as the reference population. The results from this predictive modeling are then matched or correlated with other database information to create the corresponding predictive message content classifications. In addition, given the appended database variables, various demographic, lifestyle and behavioral characteristics may also be included in or as part of the descriptions of the predictive message content (or theme) classifications.

In the exemplary embodiments, a plurality of representative, predictive message content (or message theme) classifications were developed as a result of the analysis of step 335. Several examples of predictive message content classifications are illustrated below, with corresponding, exemplary message content guidelines. It will be understood in the art that these predictive message content classifications are exemplary and for purposes of illustration and not limitation, and that any resulting set of predictive message content classifications will be empirically determined based upon the selected survey purposes; the selected survey questions and results; the survey or sample population, demographics, socioeconomics and culture; the plurality of predictive attitudinal models; and the extrapolated database population.

Exemplary Predictive Message Content (or Theme) Classifications:

First Exemplary Predictive Message Content (or Theme) Classification:

Exemplary message content guidelines include rewarding and complimenting for being the first to take advantage of new products and services, highlighting new or cutting edge products or offers, and demonstrating the prestige of the product/service offered.

Second Exemplary Predictive Message Content (or Theme) Classification:

Exemplary message content guidelines include communicating the strength and quality of a brand, the importance of relationships and customer service, emphasizing the quality of a product, emphasizing the number of years in business, and integrity and quality awards.

Third Exemplary Predictive Message Content (or Theme) Classification:

Exemplary message content guidelines include a family focus, bonuses, presenting how a product/offer is better than a competitive product/service, price comparison, and value features.

Fourth Exemplary Predictive Message Content (or Theme) Classification:

Exemplary message content guidelines include appealing to altruism, activism, and appreciation for our ecology, the use of natural ingredients, and emphasis on quality with details.

Fifth Exemplary Predictive Message Content (or Theme) Classification:

Exemplary message content guidelines include use of celebrity endorsements and testimonials to emphasize image and style, and use of incentive gifts.

Sixth Exemplary Predictive Message Content (or Theme) Classification:

Exemplary message content guidelines include demonstrating a fair value using a straightforward, logical approach, a masculine emphasis, and use of peer/user comparisons and testimonials.

Referring again to FIG. 3, following scoring of all or most entities (individuals or groups) in the database 100 using the plurality of predictive attitudinal models, concomitant assignment of membership (or non-membership) of the entities (individuals or groups) to the corresponding plurality of predictive message content classifications in step 335, and storing the resulting information in the database 100 of step 340, the exemplary method of the invention performs a cluster or grouping analysis of all such database members (entities) using either (or both) the corresponding scores from each of the plurality of predictive attitudinal models or the resulting assigned membership(s) (or probability of membership(s)) in the predictive message content classifications, step 345. This cluster or grouping analysis of step 345 not only utilizes the plurality of predictive message content classifications (and/or predictive attitudinal models), but also utilizes combinations of the various predictive message content classifications (or, equivalently, scores from the corresponding predictive attitudinal models). Any form of cluster or grouping analysis may be utilized, as known or may become known in the field. The result of this cluster or grouping analysis is a plurality of predictive attitudinal classifications. For example, those entities that belong or are assigned to the same two predictive message content classifications, or equivalently those entities that scored high in the same two corresponding predictive attitudinal models, may be clustered or grouped together into a first predictive attitudinal classification. Also for example, those entities who belong in one predictive message content classifications and who do not belong in another predictive message content classification may be clustered or grouped together into a second predictive attitudinal classification. In addition, clusters may exist for those who belong in only one predictive message content classification.

For example, for the plurality of predictive attitudinal classifications described below: a first exemplary cluster exhibited both a "trend following" attitude and an "impulsive" attitude, but not an "incentive driven" attitude; and a second exemplary cluster exhibited an "environmentally conscious" attitude, a "brand loyal" attitude, and a "buy American" attitude, but not a "price conscious" attitude.

As a result of the cluster (segmentation or grouping) analysis of step 345, a plurality of predictive attitudinal classifications are developed, generally having a greater number of classifications than the plurality of predictive message content classifications, and providing higher granularity or discrimination among the various attitudes/behaviors/demographics exhibited among the database reference population. In the exemplary embodiments, using membership or non-membership in the plurality of predictive message content classifications (based on probability scores from the predictive attitudinal models), clusters were identified where the mean value of the dichotomous variable was 0.70 or higher, indicating a segment that had at least one strong loading.

Following the cluster analysis, in step 350, each entity (individual or group) represented in the database is assigned to a predominant predictive attitudinal (behavioral or demographic) classification, of the plurality of predictive attitudinal (behavioral or demographic) classifications, based upon his, her or its highest probability of exhibiting the attitude(s) (behaviors or demographics) of interest of the corresponding classification. This assignment may be determined equivalently by the entity's scores from the predictive attitudinal models and/or the correspondingly determined memberships in one or more predictive message content classifications. For example, individuals or groups predicted to exhibit only a single attitude of interest would be assigned to that corresponding predictive attitudinal classification (or cluster), while those exhibiting more than one attitude of interest would be assigned to a corresponding predictive attitudinal classification, as a cluster of those particular of attitudes. In the exemplary embodiment, those entities (using dichotomous variables or "all or none" scores for the predictive attitudinal models) not assigned as described above are then re-clustered to identify an optimal segment or cluster, which may not meet stricter scoring requirements, but nonetheless indicate a predominant, predictive attitudinal classification. Also in the exemplary embodiments, an entity is assigned to one and only one predictive attitudinal classification; in other embodiments, multiple predictive attitudinal/behavioral/demographic classifications may be assigned.

As is the case with the scores from the plurality of predictive attitudinal models and the corresponding assignments to the plurality of predictive message content classifications, such assignments of predictive attitudinal classifications are also stored in the database 100, step 355, such as in attitudinal classification table or relation 240. As a consequence, all or most entities represented in the database 100, in accordance with the present invention, have a plurality of records stored in the database 100, namely: (1) either or both the associated scores (results) for each of the plurality of predictive attitudinal models and/or, correspondingly and equivalently, a membership (or no membership) or a degree or probability of membership in the corresponding plurality of predictive message content (or theme) classifications (message theme table 245); and (2) an assignment into a predominant, predictive attitudinal classification (attitudinal classification table 240). Following step 355, the method of determination of predictive attitudinal classifications and predictive message content classifications using a data repository, in accordance with the present invention, may end, return step 360.

In the exemplary embodiment, a plurality of predictive attitudinal classifications were developed as a result of the analysis of step 345, and representative examples are illustrated immediately below. For each such exemplary predictive attitudinal classification, corresponding marketing strategies, lifestyle and interests, demographics, behaviors and attitudes, and socioeconomic indicators are illustrated, generally derived from corresponding database variables and other information available in a database 100, as well as syndicated survey research. It will be understood in the art that these predictive attitudinal classifications and their marketing names are exemplary and for purposes of illustration and not limitation, and that any resulting set of predictive attitudinal classifications will be empirically determined based upon the selected survey questions and results; the survey population, demographics, socioeconomics and culture; the plurality of predictive attitudinal models; the extrapolated database population; and the selected cluster analysis.

Exemplary Predictive Attitudinal (or Behavioral) Classifications:

First Exemplary Predictive Attitudinal (or Behavioral) Classification:

Individuals and households in this first predictive attitudinal classification stay true to themselves and the brands that they prefer. They are selective with their purchases, and look for well-established products and services that have demonstrated quality and value. Individuals and households in this first predictive attitudinal classification are responsive to brand extensions and use coupons on the products that they already have an affinity toward. From the database 100, their lifestyle and interests include enjoyment of reading and visits to bookstores; television viewing and preferring informative programming and movie classics; investing wisely and often; maintaining an exercise and fitness regimen; and participation in activities such as golf, tennis, fishing, and occasional gambling. Also from the database 100, their demographics include being established mid-lifers; married, divorced or single; any children are grown and have left home; they typically own their own homes, and have established residences, usually in larger, affluent cities. The behaviors and attitudes of the individuals and households in this first predictive attitudinal classification include being ardent catalog shoppers; having a preference for outdoor lifestyle companies; shopping at upscale retail stores; preferring "the real thing" to generic products; visiting the grocery store frequently with a likelihood of using coupons to save on preferred brands; and enjoyment of domestic and overseas travel. Their socioeconomic indicators include a high income; an above average home value; established credit experience with a well-maintained, stable credit history; an undergraduate degree and some graduate studies; occupations including finance, accounting, engineering and real estate; and they drive luxury vehicles.

Second Exemplary Predictive Attitudinal (or Behavioral) Classification:

Individuals and households in this second predictive attitudinal classification represent a highly affluent, successful and stable consumer market, containing established old-wealth and the nouveau riche. Their investments and dividends are as impressive as their incomes. They aspire to own and use the finest quality brands and services, and they are willing to pay the extra dollar for the privilege of living this lifestyle. They enjoy traveling quite extensively, so incentives that provided added benefit in this area are preferable. The active lifestyles they lead drive them to utilize all modes of convenient communication. The lifestyle and interests of individuals and households in this second predictive attitudinal classification include a love to travel domestically and overseas, preferring cruises and tours; shopping at mid-level to upscale stores; diverse sports interests and may be avid golfers; socially involved as club members, theatre and concert-goers, and with environmental causes. Their demographics include a wide age range, from young to mature adults; largest concentration is established and mid-life adults, who are typically married; their children range in age from grade school to high school; they typically own their own homes, having well-established residences, usually in comfortable and prosperous neighborhoods, in major and mid-size cities, and in urban city settings. The behaviors and attitudes of the individuals and households in this second predictive attitudinal classification include "working to live" rather than "living to work"; they are active, affluent, have an influential lifestyle and are financially astute; they make time for family and individual interests, and want the "good life" for their family; they are technology- and internet-savvy, with frequent web accessing. The socioeconomic indicators include a high income; an above average home value; extensive, established and good credit experience; they have an undergraduate degree with some graduate studies; their occupations include finance, engineering, healthcare, counseling, computer/technology and marketing; they are more likely to lease vehicles than to buy; drive new and used import cars and light trucks, and are drawn to near-luxury, luxury, specialty and SUV models.

Third Exemplary Predictive Attitudinal (or Behavioral) Classification:

Individuals and households in this third predictive attitudinal classification are dedicated sports fans that enjoy a wide variety of outdoor pursuits—from do-it-yourself home improvement projects to scuba diving, and they enjoy their lifestyle. Their independence may make it a challenge to establish relationships with these customers, and they prefer product samples to coupons to provide immediate proof of the product's quality and immediate savings. Their lifestyle and interests include being outdoor enthusiasts; they have no preference for brand name goods over generic brands; they are dedicated sports fans, they enjoy working on mechanics, home improvement, boating, motorcycles, scuba diving and video games. The demographics of individuals and households in this third predictive attitudinal classification include mainly being young adults, who are single or divorced, with low indications of children present in the household; they typically rent instead of own residences, and live in apartments rather than single-family homes, with a wide variety of residential settings, often transient or in rural towns. Individuals and households in this third predictive attitudinal classification have behaviors and attitudes such as liking things to be simple and straightforward, "rough and rugged", and self-determining. Socioeconomic indicators of individuals and households in this third predictive attitudinal classification include a below average income; a slightly below average home value; a newer credit experience with average extension; varied education levels; typically employed in service- and consumer-oriented industries and/or may be students; they typically drive used, domestic vehicles, and models include small to mid-size cars and small- and full-size pickup trucks.

Fourth Exemplary Predictive Attitudinal (or Behavioral) Classification:

Individuals and households in this fourth predictive attitudinal classification are conservative, content with the status quo and not easily swayed. They focus on "hearth and home" for comfort and entertainment, avidly donate to the causes they support, and enjoy timeless activities such as leisure sports, musical performances, gardening, and reading. As consumers, they are motivated to spend money on their families, homes and hobbies but are careful to spend it well, making them highly responsive to coupons and discount offers. Their lifestyle and interests include family-oriented, domestic activities such as home improvement projects, gardening, cooking and entertaining. They are typically passionate donors that support causes such as religious, political and health issues. They are also devoted book and magazine lovers and sports enthusiasts. The demographics of the individuals and households in this fourth predictive attitudinal classification are that they are mainly seniors and retirees, typically married, whose children have left home (empty nesters). They typically own their own homes, usually multi-dwelling units rather than single-family homes, and prefer to live in rural towns and small city communities. The behaviors and attitudes of the individuals and households in this fourth predictive attitudinal classification include a relaxed living attitude, with a healthy standard of living, deriving significant pleasure from daily activities with family and friends. They make the most of their spending and utilize coupons. They like to keep up on interests in music, trivia and collectibles. Socioeconomic indicators for this classification include a low income, with an average to below average home value; stable, consistent and capable credit experience; they are typically high school graduates with some college; and primarily are retired. They typically drive domestic used vehicles that include mid-range cars and pick-up trucks The plurality of predictive attitudinal classifications and plurality of predictive message content classifications, with additional information available in a database 100 as discussed below, become extraordinarily powerful tools when applied to a selected population, such as a group of individuals represented in a customer database, a prospect database, a client database, a membership database, an association database, and so on. In the exemplary embodiment, the additional information available in the database 100 includes, for all or most of the represented (or matched) individuals, households, living units or other entities: their preferred methods of communication and/or communication media (communication media table 250), their preferred times (time of day) of communications (communication timing table 255), their preferred frequencies of communication (communication frequency table 260), and their preferred sequences of communication (communication sequence table 285). This additional information may be determined in a wide variety of ways, including self-reported preferences and behaviors, third-party reported preferences and behaviors (such as transactions, purchases, and activities), observed preferences and behaviors, and inferred preferences and behaviors based on modeled data.

Figure 4A:
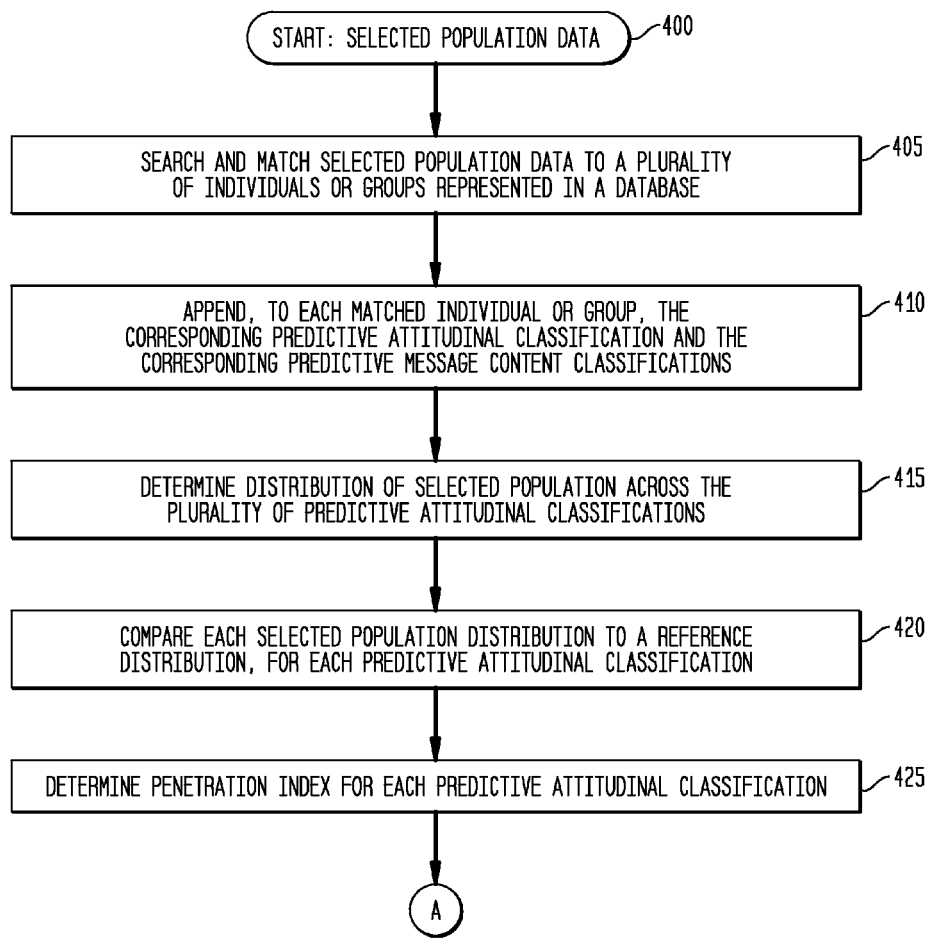
FIG. 4 (divided into FIGS. 4A, 4B and 4C and collectively referred to as FIG. 4), is a flow diagram illustrating an exemplary method of independently predicting a plurality of attitudinal classifications, a plurality of message content classifications, and other predictive information, of a selected population using a data repository in accordance with the present invention.
Figure 4B:
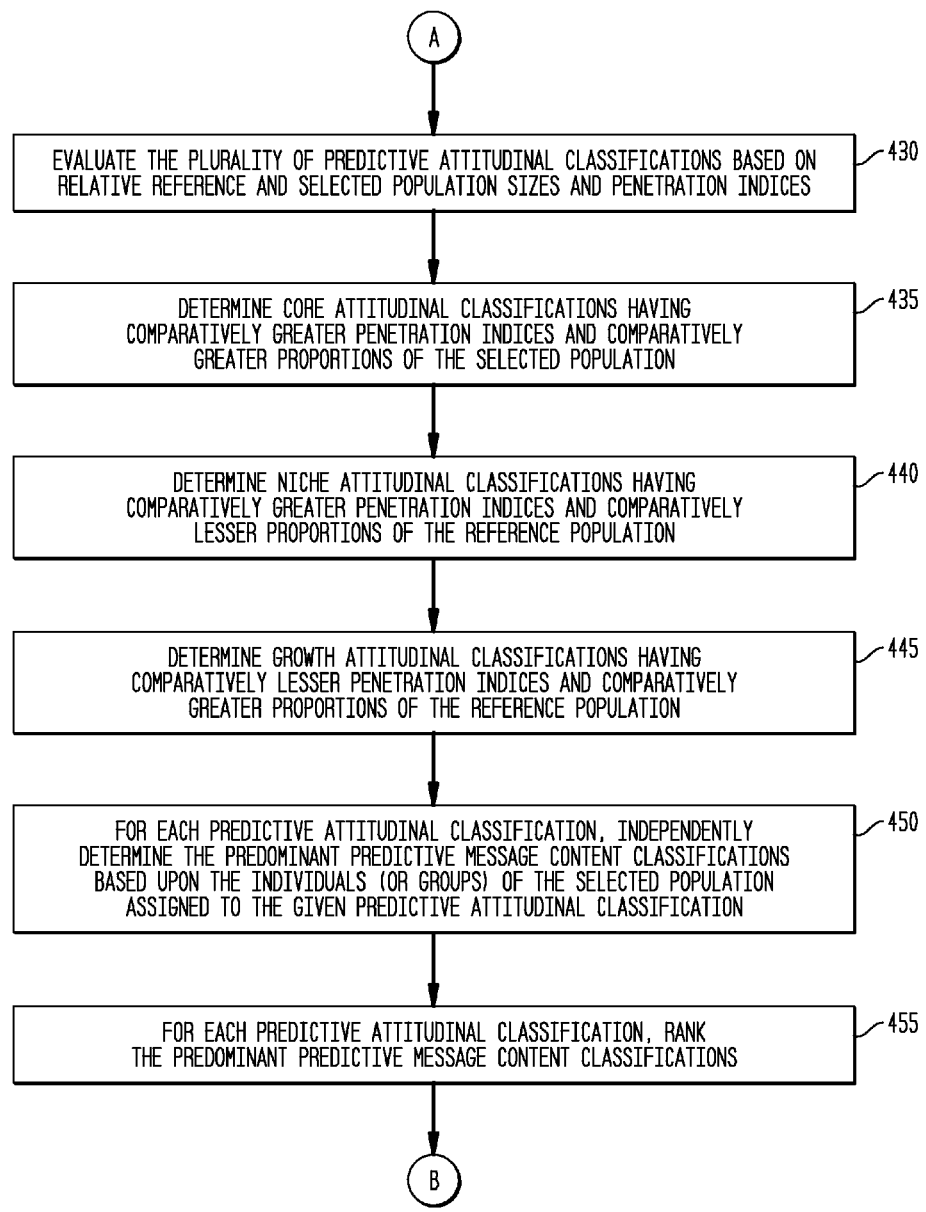

FIG. 4 is a flow diagram illustrating an exemplary method of independently predicting a plurality of attitudinal classifications and a plurality of message content classifications of a selected population in accordance with the present invention. In addition, depending upon the selected embodiment, predicted communication and/or media channels, predicted communication timing, predicted communication frequency, and predicted communication sequencing, may also be provided as part of the method illustrated with reference to FIG. 4.

Referring to FIG. 4, the method begins, start step 400, with data about or concerning a selected population, such as name and/or name and address information from a customer database or file, a customer prospect file or list, or any other identifying data or information of or for a group of individuals, households, living units, groups or other entities, for any selected purpose. The database 100 is then searched and the selected population data is matched with the records of the database 100, step 405, such as matched with the records of the INSOURCE® database. For all records where a match is found in step 405, the method appends, references or links, to each (matched) entity of the selected population, their corresponding (i.e., predominant) predictive attitudinal classification, and their corresponding predictive message content classification(s), step 410. As discussed above, for each such entity, their corresponding predictive attitudinal classification is generally their predominant attitudinal classification of the plurality of predictive attitudinal classifications, and their corresponding predictive message content classifications are generally their memberships or probabilities of membership in each of the plurality of predictive message content classifications. In the exemplary embodiments, optionally as part of step 410, the method also appends, references or links the entity's associated information concerning predicted communication and media channels, predicted communication timing, predicted communication frequency, and predicted communication sequence.

There are a wide variety of alternatives or defaults for non-matching entities of step 405, including variations depending upon degrees or levels of matching. Exemplary alternatives include, for non-matching individuals or groups, appending and utilizing the average, most common or mode classifications for a particular geographic region, such as a postal code area. Another alternative includes excluding those non-matching individuals or groups from the remainder of the method and, equivalently, the selected population may be considered to be comprised of the matching entities from step 405. Those of skill in the art will recognize that the matching step 405 and the appending step 410 may be performed in a plurality of ways, including use of conditional loops or iterations, with each iteration corresponding to the matching and appending for a given entity, and with iterations continuing until all entities have been matched (or found to not match) and corresponding data appended.

The method then determines the distribution of the selected population across or within each of the predictive attitudinal classifications, to form a corresponding plurality of selected population distributions, step 415. Each selected population distribution is compared to a reference distribution for each of the predictive attitudinal classifications, step 420. Typically, a reference or baseline distribution is or may be the distribution, across or within each of the predictive attitudinal classifications, of the larger, often national or regional population represented in the database 100, referred to above as the reference population. For example, for a selected population, such as the purchasers of a particular automobile brand, when compared to a larger regional or national population on a proportional or percentage basis, that selected population may be comparatively or relatively over-represented in certain predictive attitudinal classifications, and that selected population may be comparatively or relatively under-represented in other predictive attitudinal classifications.

Based on these comparisons of the distribution of the selected population with a reference distribution, for each predictive attitudinal classification of the plurality of predictive attitudinal classifications, a "penetration" or comparative index (or rate) is determined, step 425, with a comparatively greater or higher penetration index indicative of a higher proportional concentration of entities of the selected population within a given predictive attitudinal classification compared to the reference distribution, and with a comparatively lower or lesser penetration index indicative of a lower proportional concentration of entities of the selected population within a given predictive attitudinal classification compared to the reference distribution. For example, a 15% distribution of the selected population for the predictive attitudinal classification of "Q", when compared to an 8% distribution for the reference population for this same "Q" predictive attitudinal classification, indicates a comparatively higher (or above average) penetration index or rate (a ratio of 1.875) of the selected population in this classification. Similarly, an 11% distribution of the selected population for the predictive attitudinal classification of "P", when compared to a 16% distribution for the reference population for this same "P" predictive attitudinal classification, indicates a comparatively lower (or below average) penetration index or rate (a ratio of 0.6875) of the selected population in this classification.

In addition, for each predictive attitudinal classification, the reference distribution may be normalized to a particular value, such as 100 or 1.0, e.g., a reference distribution of 11% in a first predictive attitudinal classification may be normalized to 100 and a reference distribution of 7% in a second predictive attitudinal classification may also be normalized to 100. Also for example, for the selected population, and for a given predictive attitudinal classification, a penetration index of 150 or 1.5 may be utilized to indicate that the selected population has proportionally (or percentage-wise) 50% (or 1.5 times) more individuals (households, living units or other groups) in that given predictive attitudinal classification compared to the larger reference population, such as a national or regional population. As illustrated above with the various percentage distributions for the "Q" and "R" predictive attitudinal classifications, these comparisons are performed on a proportional or percentage basis, rather than a comparison of pure or gross numbers, as the selected population generally concerns a considerably smaller total number of individuals (or groups) compared to the reference population represented in the database 100.

As a result of step 425, penetration indices or rates are determined for each predictive attitudinal classification of the plurality of predictive attitudinal classifications, comparing the proportion or distribution of the selected population in that classification to the proportion or distribution of the reference population in that classification. The plurality of predictive attitudinal classifications are then evaluated by their penetration indices and, depending upon the selected embodiment, are also evaluated based upon the relative (or proportional) reference and selected population sizes within each predictive attitudinal classification, step 430. Using the penetration indices and relative or comparative reference and selected population sizes of each predictive attitudinal classification, three additional levels of attitudinal classifications are determined, namely, core attitudinal classifications, niche attitudinal classifications, and growth attitudinal classifications (steps 435, 440, 445). While core determinations are usually determined first (to avoid potential confusion with niche determinations, as based upon proportions of the selected population in addition to penetration indices), the other determinations may be performed in any order. In other variations, depending upon the selected evaluation algorithm, other determination orders for core, niche and growth attitudinal classifications may be available.

More specifically, in step 435, one or more core attitudinal classifications are determined by selecting, from the plurality of predictive attitudinal classifications, at least one predictive attitudinal classification having a comparatively greater (e.g., average or above) penetration index and having a comparatively greater proportion of the selected population. These core attitudinal classifications represent predictive attitudinal classifications having the largest percentage of the selected population, such as customers, and corresponding, significant market share. With respect to a selected population of customers of a particular brand, the core attitudinal classifications represent significant brand appeal to population segments exhibiting corresponding behavioral characteristics.

In step 440, one or more niche attitudinal classifications are determined by selecting, from the plurality of predictive attitudinal classifications, at least one predictive attitudinal classification having a comparatively greater (e.g., average or above) penetration index and having a comparatively lesser proportion of the reference population. These niche attitudinal classifications represent predictive attitudinal classifications having a high penetration rate (and corresponding market share), but a relatively small percentage of the reference population, such as a small percentage of a prospect population.

In step 445, one or more growth attitudinal classifications are determined by selecting, from the plurality of predictive attitudinal classifications, at least one predictive attitudinal classification having a comparatively lesser (e.g., below average) penetration index and having a comparatively greater proportion of the reference population. These growth attitudinal classifications represent predictive attitudinal classifications having some penetration success, and with the comparatively large percentages of the reference population, such as prospective customers, indicate significant opportunities to increase penetration and add new customers from an otherwise underrepresented group.

To this point in the method of the present invention, considerable attitudinal and behavioral information has been provided, which may be utilized for a wide variety of purposes. Based on empirical modeling, actual attitudes and behaviors of segments of a selected population may be predicted, using the plurality of predictive attitudinal classifications. Depending upon selected purposes of the embodiment, additional information may be provided, such as the actual attitudes and behaviors of individuals or groups in the predictive attitudinal classifications, including the core, niche and growth classifications.

Additional information is also independently provided in accordance with the present invention. While a selected population has been predictively classified as exhibiting certain attitudes and behaviors, as "who" segments (such as who among the population are significant customers or prospects), an additional, independent and more fine-grained level of information is also provided, based upon the plurality of predictive message content classifications, providing independent "what" segments (such as what content will be most effective). More specifically, the actual members of the selected population, although assigned to a predictive attitudinal classification as a predominant classification, may also exhibit other or different attitudes and behaviors, represented by a probability or membership in one or more predictive message content classifications, in addition to those of the predominant predictive attitudinal classification. As consequence, in step 450, for each of the plurality of predictive attitudinal classifications, the method also independently determines one or more predictive message content classifications, based on the predictive message content classifications of the actual entities (individuals or groups) of the selected population assigned to that selected predictive attitudinal classification. For each predictive attitudinal classification, the plurality of predictive message content classifications may also be ranked, such as by comparative or relative penetration, proportion or distribution of a given predictive message content classification for that predictive attitudinal classification, step 455.

This independent determination of predictive message content classifications based upon the actual, selected population (step 450 and optional ranking step 455) within each predictive attitudinal classification, may be used to produce (or effectively results in) an information matrix or data structure, consisting of the plurality of predictive attitudinal classifications (e.g., as rows) and the plurality of predictive message content classifications (e.g., as columns), both of which may be further ranked or ordered according to relative distribution, penetration and/or population size. As a result, not only may a selected population be predictively classified or segmented attitudinally and behaviorally, using the plurality of predictive attitudinal classifications, they may also be independently and predictively classified based on content or theme receptivity, using the plurality of predictive message content classifications. Communication channel, media, timing, frequency, and sequencing information may also be included in such a matrix, e.g., as columns, and is discussed in greater detail below, as the various fields of a data structure of the present invention.

In the exemplary embodiments, with the availability of channel, media, timing, frequency, and sequencing information in the database 100, the method continues with step 460, in which the predominant communication channel and/or media preferences are determined for each predictive attitudinal classification of the plurality of predictive attitudinal classifications, based upon the preferred communication channels and/or preferred media types of the entities (individuals or groups) of the selected population assigned to the given predictive attitudinal classification, such as email, internet, direct mail, telecommunication, radio (broadcast, cable and satellite), television (network (broadcast), cable or satellite), video (or DVD) media, print media, electronic media, visual or other public display media, and depending upon the selected embodiment, the plurality of communication and media channel classifications may be more or less specific, such as further subdividing print and electronic media channels into newspaper, weekly magazines, monthly magazines, journals, business reports, and further into their print, internet, email or electronic versions. For example, predominant communication channels for a first predictive attitudinal classification may be, in preferred order, direct mail followed by radio followed by email, while predominant communication channels for a second predictive attitudinal classification may be, also in preferred order, television followed by telecommunication followed by direct mail.

In step 465, the predominant timing (time of day) preferences for communications are determined for each predictive attitudinal classification of the plurality of predictive attitudinal classifications, also based upon the communication timing preferences of the entities (individuals or groups) of the selected population assigned to the given predictive attitudinal classification. For example, predominant timing preferences for a first predictive attitudinal classification may be, in preferred order, weekends followed by evening, while predominant timing preferences for a second predictive attitudinal classification may be, also in preferred order, mornings followed by afternoons. The timing preferences may be further qualified based upon media and communication channels, such as predominant timing preferences being evenings for television, and weekends for telecommunications.

In step 470, optionally, the predominant frequency preferences for communications are determined for each predictive attitudinal classification of the plurality of predictive attitudinal classifications, also based upon the frequency of communication preferences of the entities (individuals or groups) of the selected population assigned to the given predictive attitudinal classification. For example, predominant frequency preferences for a first predictive attitudinal classification may be, in preferred order, monthly followed by semi-annually, while predominant timing preferences for a second predictive attitudinal classification may be, also in preferred order, weekly followed by bi-weekly. The predominant frequency of communications also may be further qualified based on either or both timing preferences and media and communication channels, such as no frequency preference (unlimited) for television communications, and zero frequency (no communication) for telecommunication channels (e.g., telephone call, faxes).

In step 475, optionally, the predominant sequencing preferences for communications are determined for each predictive attitudinal classification of the plurality of predictive attitudinal classifications, also based upon the sequencing of communication preferences of the entities (individuals or groups) of the selected population assigned to the given predictive attitudinal classification. This information may also be incorporated into the matrix discussed above and the data structure discussed below.

Lastly, this collection of information is output and, in the illustrated exemplary embodiment, also stored in a database, step 480. In the exemplary embodiment, as indicated, a matrix or data structure of information is provided in step 480, indicating the following:

(1) the plurality of predictive attitudinal classifications, ordered by core, niche and growth attitudinal classifications (and corresponding penetration indices);

(2) for each predictive attitudinal classification of the plurality of predictive attitudinal classifications, the predominant predictive message content classifications of the selected population assigned to that given predictive attitudinal classification;

(3) for each predictive attitudinal classification of the plurality of predictive attitudinal classifications, the predominant communication and/or media channel classifications of the selected population assigned to that given predictive attitudinal classification;

(4) for each predictive attitudinal classification of the plurality of predictive attitudinal classifications, the predominant communication timing classifications of the selected population assigned to that given predictive attitudinal classification;

(5) as an additional option in the exemplary embodiments, for each predictive attitudinal classification of the plurality of predictive attitudinal classifications, the predominant frequency of communication classifications of the selected population assigned to that given predictive attitudinal classification;

(6) as an additional option in the exemplary embodiments, for each predictive attitudinal classification of the plurality of predictive attitudinal classifications, the predominant sequencing of communication classifications of the selected population assigned to that given predictive attitudinal classification.

Following the output of information in step 480, the method may end, return step 485.

As indicated above, the system of the present invention generally comprises a memory storing a data repository (or database) 100 and a processor, such as a processor 115 included within a mainframe computer of system 110 or within either (or both) a database management server 140 or an application server 125 of system 150. The processor is programmed to perform the methodology of the present invention. As a consequence, the system and method of the present invention may be embodied as software which provides such programming.

More generally, the system, methods and programs of the present invention may be embodied in any number of forms, such as within any type of computer, within a workstation, within an application server such as application server 125, within a database management server 140, within a computer network, within an adaptive computing device, or within any other form of computing or other system used to create or contain source code. Such source code further may be compiled into some form of instructions or object code (including assembly language instructions or configuration information). The software or source code of the present invention may be embodied as any type of source code, such as SQL and its variations (e.g., SQL 99 or proprietary versions of SQL), C, C++, Java, or any other type of programming language which performs the functionality discussed above. As a consequence, a "construct" or "program construct", as used herein, means and refers to any programming language, of any kind, with any syntax or signatures, which provides or can be interpreted to provide the associated functionality or methodology (when instantiated or loaded into a server or other computing device).

The software or other code of the present invention, such as any resulting or compiled bit file (object code or configuration bit sequence), may be embodied within any tangible storage medium, such as within a memory or storage device for use by a computer, a workstation, any other machine-readable medium or form, or any other storage form or medium for use in a computing system. Such storage medium, memory or other storage devices may be any type of memory device, memory integrated circuit ("IC"), or memory portion of an integrated circuit (such as the resident memory within a processor IC), including without limitation RAM, FLASH, DRAM, SRAM, MRAM, FeRAM, ROM, EPROM or EPROM, or any other type of memory, storage medium, or data storage apparatus or circuit, depending upon the selected embodiment. For example, without limitation, a tangible medium storing computer readable software, or other machine-readable medium, may include a floppy disk, a CDROM, a CD-RW, a magnetic hard drive, an optical drive, a quantum computing storage medium or device, a transmitted electromagnetic signal (e.g., used in internet downloading), or any other type of data storage apparatus or medium.

The results, information and other data provided by the system, methods and programs of the present invention also may be embodied as a data structure and stored or provided in any number of forms and media, such as a data structure stored within any type of computer, within a workstation, within an application server such as application server 125, within a database management server 140, within a computer network, within a database 100, within an adaptive computing device, or within any form of memory, storage device, or machine-readable media, as discussed above. In accordance with the present invention, such a data structure is comprised of at least two fields of a plurality of fields, as follows.

A first field of the plurality of fields provides or stores information, such as codes or designations, pertaining to a first plurality of classifications which provide identification of persons according to a selected property. For example, the plurality of predictive attitudinal classifications identify persons (in either or both the reference population or the selected population), according to an attitudinal (selected) property. In other circumstances, this identification of "who" may be based on other selected properties, such as behavioral characteristics, demographic characteristics, geographic characteristics, financial characteristics, transactional characteristics, etc., such as identification of persons who engage in certain activities, who live in certain types of households, who live in a certain region or postal code area, who have incomes greater than a certain amount, who purchase particular goods of a particular monetary amount, and so on.

Optionally, depending upon the selected embodiment, additional fields related to this first field or which are subfields of this first field provide or store additional information pertaining to, for example, the percentage of the selected population or the reference population within each classification of the first plurality of classifications, or the corresponding penetration indices for each classification of the first plurality of classifications, or both, such as the corresponding penetration indices for the plurality of predictive attitudinal classifications. Other information in these additional fields or subfields may also specify a size of a prospect population, for marketing applications, for example.

Also optionally, depending on the selected embodiment, the first field may also include additional fields or subfields based on other relevant or related properties. For example, this first field may be further divided into categories such as core, niche and growth classifications, as discussed above.

A second field of the plurality of fields provides or stores information, such as codes or designations, pertaining to a second plurality of classifications, in which the second plurality of classifications provides information pertaining to a corresponding plurality of message versions, message content, or message themes. This second field providing a designation or code for the "what" of a communication will typically have one or two forms (or both), such as containing general information concerning types of messages, as in the plurality of predictive message content classifications described above, or containing more particular information, such as specific content versions correspondingly tailored to the plurality of predictive message content classifications. For an example of the latter case, this second field may include at least one designation or code for a particular version (of a plurality of content versions) for use in a direct mail to the entities identified in the first field (via the plurality of predictive attitudinal classifications), with other versions transmitted to other entities of the other classifications of the first plurality of classifications.

A third field of the plurality of fields provides or stores information, such as codes or designations, pertaining to a third plurality of classifications which provide media/channel information, such as the media and channel preferences which correspond to the preferences of the individuals identified in the first field. For example, this third field may include designations or codes (providing the "how" of a communication) corresponding to communication media (channels), such as for electronic mail, internet, direct mail, telecommunication, broadcast media (such as radio, television, cable, satellite), video media, optical media (DVD, CD), print media (newspaper, weekly magazines, monthly magazines, journals, business reports), electronic media (such as web sites and electronic forms of newspapers, magazines), and public display media (such as signage, billboards, multimedia displays).

A fourth field of the plurality of fields provides or stores information, such as codes or designations, pertaining to a fourth plurality of classifications which provide communication timing information. For example, this fourth field may include designations or codes (providing the "when" of a communication) corresponding to communication timing classifications such as morning, afternoon, evening, night, weekday, weekend, any time (no preference), and none.

A fifth field of the plurality of fields provides or stores information, such as codes or designations, pertaining to a fifth plurality of classifications which provide frequency of communication information. For example, this fifth field may include designations or codes corresponding to predictive communication frequency classifications, such as daily, weekly, biweekly, monthly, semi-monthly, bimonthly, annually, semi-annually, and none.

A sixth field of the plurality of fields provides or stores information, such as codes or designations, pertaining to a sixth plurality of classifications which provide communication sequencing information. For example, this fourth field may include designations or codes corresponding to particular sequences of communications, such as direct mail, followed by electronic media, followed by email. As indicated above, there are innumerable such combinations available.

A wide variety of selections of which fields are included in the data structure and the ordering of these various selected fields are available, as will be apparent to those of skill in the art, and are within the scope of the invention. In addition, this data structure embodiment may be housed, embodied, or stored in myriad orders and locations, such as different memory locations as directed by a DMA engine or memory address generator, for example. The data structure of the present invention may also be embodied, stored, distributed or communicated in a wide variety of forms, such as electronically (e.g., internet, wireless, email, storage disk), or through various print media, for example, such as in the form of a market research report.

In summary, the present invention provides a method, system and software for independently predicting a plurality of attitudinal classifications and a plurality of message content classifications, for a selected population of a plurality of entities (such as individuals or households) represented in a data repository. The method, system and software embodiments of the invention, in operation, each perform the following:

First, for each entity of the plurality of entities of the selected population, appending from the data repository a corresponding predictive attitudinal classification of a plurality of predictive attitudinal classifications and a corresponding plurality of predictive message content classifications, with the corresponding predictive attitudinal classification and corresponding plurality of predictive message content classifications having been determined using a plurality of predictive attitudinal models developed from a sample population and applied to a reference population represented in the data repository.

Second, for each predictive attitudinal classification of the plurality of predictive attitudinal classifications, determining a penetration index of the selected population compared to the reference population; and Third, for each predictive attitudinal classification of the plurality of predictive attitudinal classifications, independently determining at least one predominant predictive message content classification from the appended plurality of predictive message content classifications of the plurality of entities of the selected population having the corresponding predictive attitudinal classification of the plurality of predictive attitudinal classifications.

Typically, the independent determination of at least one predominant predictive message content classification comprises: for each predictive attitudinal classification, determining all of the appended plurality of predictive message content classifications of the plurality of entities of the selected population having the corresponding predictive attitudinal classification; and selecting one or more predictive message content classifications corresponding to a comparatively greater number of entities of the selected population.

In addition, depending upon the selected embodiment, for each entity of the plurality of entities of the selected population, the various embodiments provide for appending from the data repository at least one corresponding predictive communication media/channel classification of a plurality of predictive communication media classifications, with the corresponding predictive communication media classification having been determined from information stored in the data repository. For each predictive attitudinal classification of the plurality of predictive attitudinal classifications, the various embodiments provide for independently determining at least one predominant predictive communication media classification from the appended plurality of predictive communication media classifications of the plurality of entities of the selected population having the corresponding predictive attitudinal classification of the plurality of predictive attitudinal classifications. Typically, the plurality of predictive communication media classifications comprises at least two of the following communication media: electronic mail (email), direct mail, telecommunication, radio, television, video or DVD (digital versatile disk) media, print media, and visual or public display media. Depending upon the selected embodiment, the plurality of communication and media channel classifications may be more or less specific, such as further subdividing print and electronic media channels into newspaper, weekly magazines, monthly magazines, journals, business reports, and further into their print, internet, email or electronic versions, and such as further subdividing broadcast media such as radio and television into network, cable, satellite, etc.

Similarly, depending upon the selected embodiment, for each entity of the plurality of entities of the selected population, the various embodiments provide for appending from the data repository at least one corresponding predictive communication timing classification of a plurality of predictive communication timing classifications, the corresponding predictive communication timing classification having been determined from information stored in the data repository. For each predictive attitudinal classification of the plurality of predictive attitudinal classifications, the various embodiments provide for independently determining at least one predominant predictive communication timing classification from the appended plurality of predictive communication timing classifications of the plurality of entities of the selected population having the corresponding predictive attitudinal classification of the plurality of predictive attitudinal classifications. Also typically, the plurality of predictive communication timing classifications comprises at least two of the following communication timing classifications: any time, morning, afternoon, evening, night, weekday, and weekend.

Also similarly, depending upon the selected embodiment, for each entity of the plurality of entities of the selected population, the various embodiments provide for appending from the data repository at least one corresponding predictive communication frequency classification of a plurality of predictive communication frequency classifications, the corresponding predictive communication frequency classification having been determined from information stored in the data repository. For each predictive attitudinal classification of the plurality of predictive attitudinal classifications, the various embodiments provide for independently determining at least one predominant predictive communication frequency classification from the appended plurality of predictive communication frequency classifications of the plurality of entities of the selected population having the corresponding predictive attitudinal classification of the plurality of predictive attitudinal classifications. The plurality of predictive communication frequency classifications typically comprises at least two of the following frequency classifications: daily, weekly, biweekly, monthly, semi-monthly, bimonthly, annually, semi-annually, unlimited, and none.

Also similarly, depending upon the selected embodiment, for each entity of the plurality of entities of the selected population, the various embodiments provide for appending from the data repository at least one corresponding predictive communication sequencing classification of a plurality of predictive communication sequencing classifications, the corresponding predictive communication sequencing classification having been determined from information stored in the data repository. For each predictive attitudinal classification of the plurality of predictive attitudinal classifications, the various embodiments provide for independently determining at least one predominant predictive communication sequencing classification from the appended plurality of predictive communication sequencing classifications of the plurality of entities of the selected population having the corresponding predictive attitudinal classification of the plurality of predictive attitudinal classifications.

As part of the present invention, the various embodiments provide for determining the selected population of the plurality of entities by matching a listing of a plurality of customers to the reference population represented in the data repository. Alternatively, non-matching entities of the selected population may simply be considered eliminated from the processes involving the selected population. Exclusion of entities of the selected population from these processes may also be dependent upon a level or degree of match to the entities of the data repository 100, such as matching to an individual, a household, or merely a geographic or postal code area.

Also in summary, in the various embodiments, the plurality of predictive message content classifications are determined by: developing a plurality of empirical attitudinal factors based on a factor analysis of an attitudinal survey of the sample population; using each empirical attitudinal factor of the plurality of empirical attitudinal factors, scoring each participant of the attitudinal survey to create a corresponding plurality of empirical attitudinal factor scores; using a plurality of selected variables from the data repository as independent variables, and using the corresponding plurality of empirical attitudinal factor scores as dependent variables, performing a regression analysis to create the plurality of predictive attitudinal models; and using each predictive attitudinal model of the plurality of predictive attitudinal models, scoring the plurality of entities represented in the data repository, as the reference population, to create the plurality of predictive message content classifications. The plurality of predictive attitudinal classifications are determined by a cluster analysis of the plurality of predictive message content classifications of each entity of the plurality of entities represented in the data repository.

The invention also provides for determining core, niche and growth attitudinal classifications, as follows: determining one or more core attitudinal classifications by selecting, from the plurality of predictive attitudinal classifications, at least one predictive attitudinal classification having a comparatively greater (e.g., average or above average) penetration index and having a comparatively greater proportion of the selected population; determining one or more niche attitudinal classifications by selecting, from the plurality of predictive attitudinal classifications, at least one predictive attitudinal classification having a comparatively greater penetration index and having a comparatively lesser proportion of the reference population; and determining one or more growth attitudinal classifications by selecting, from the plurality of predictive attitudinal classifications, at least one predictive attitudinal classification having a comparatively lesser (e.g., below average) penetration index and having a comparatively greater proportion of the reference population.

Numerous advantages of the present invention are readily apparent. The embodiments of the present invention provide a predictive methodology, system and software, for accurate prediction of attitudes, motivations and behaviors, which may be utilized for marketing, research, assessment, and other applications. The embodiments of the invention are empirically-based upon actual attitudinal research and other information from a population sample, and provide accurate modeling to predict and extrapolate such attitudinal information to a larger reference population. In addition to identifying to "whom" a communication should be directed, the embodiments of the invention further provide information concerning the "what" of the communication, such as the preferred message themes or message content, independently from any population grouping, segmentation or clustering process. In addition, the embodiments of the invention provide actionable results, providing not only audience attitudinal information and preferred message content, but also preferred communication channel or media information, communication frequency, communication timing information, and communication sequencing information.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

It is claimed:

1. A computing system-implemented method for automatically generating a plurality of communications to a selected population of a plurality of entities represented in one or more data repositories stored in one or more data storage devices, the method comprising:

using the computing system, retrieving from one or more data storage devices an identification of a selected population, represented in the one or more data repositories, to receive a plurality of communications;

using the computing system, retrieving from the one or more data storage devices an identification of a first group of individuals of the selected population comprising individuals having at least one core predictive identification classification, of a plurality of predictive identification classifications, having a comparatively greater penetration index and having a comparatively greater proportion of the selected population;

using the computing system, retrieving from the one or more data storage devices an identification of a second group of individuals of the selected population comprising individuals having at least one niche predictive identification classification, of the plurality of predictive identification classifications, having a comparatively greater penetration index and having a comparatively lesser proportion of a reference population;

using the computing system, retrieving from the one or more data storage devices an identification of a third group of individuals of the selected population comprising individuals having at least one growth predictive identification classification, of the plurality of predictive identification classifications, having a comparatively lesser penetration index and having a comparatively greater proportion of the reference population;

using the computing system, retrieving from the one or more data storage devices a plurality of message content versions;

using the computing system, retrieving from the one or more data storage devices, for each communication of the plurality of communications, a selected communication timing, of a plurality of potential communication timings, determined using at least one at least one predominant predictive communication timing classification of a plurality of predictive communication timing classifications;

using the computing system, automatically generating a plurality of first communications, of the plurality of communications, to the first group of individuals, the plurality of first communications having at least one first message content version of the plurality of message content versions, and for each communication of the plurality of first communications, automatically transmitting the communication electronically according to the selected communication timing for the selected individual of the first group of individuals;

using the computing system, automatically generating a plurality of second communications, of the plurality of communications, to the second group of individuals, the plurality of second communications having at least one second message content version of the plurality of message content versions, the second group of individuals different from the first group of individuals and the at least one second message content version different from the at least one first message content version, and for each communication of the plurality of second communications, automatically transmitting the communication electronically according to the selected communication timing for the selected individual of the second group of individuals; and using the computing system, automatically generating a plurality of third communications, of the plurality of communications, to the third group of individuals, the plurality of third communications having at least one third message content version of the plurality of message content versions, the third group of individuals different from the first and second groups of individuals and the at least one third message content version different from the at least one first and at least one second message content versions, and for each communication of the plurality of third communications, automatically transmitting the communication electronically according to the selected communication timing for the selected individual of the third group of individuals.

2. The computing system-implemented method of claim 1, further comprising:

using the computing system, retrieving from the one or more data storage devices, for each communication of the plurality of communications, a selected communication medium, of a plurality of communication media, determined using at least one predominant predictive communication media classification of a plurality of predictive communication media classifications; and using the computing system, for each communication of the plurality of communications, automatically generating the communication using the selected communication medium for the selected individual of the first, second and third groups of individuals.

3. The method of claim 2, wherein the plurality of predictive communication media classifications comprises at least two of the following: electronic mail (email), telecommunication, radio, television, internet, satellite, cable media, video media, and combinations thereof.

4. The method of claim 2, wherein the plurality of predictive communication timing classifications comprises at least two of the following communication timing classifications: any time, morning, afternoon, evening, night, weekday, weekend, and combinations thereof.

5. The computing system-implemented method of claim 1, further comprising:

using the computing system, retrieving from the one or more data storage devices, for each communication of the plurality of communications, a selected communication frequency, of a plurality of communication frequencies, determined using at least one at least one predominant predictive communication frequency classification of a plurality of predictive communication frequency classifications; and using the computing system, for each communication of the plurality of communications, automatically generating the communication using the selected communication frequency for the selected individual of the first, second and third groups of individuals.

6. The method of claim 5, wherein the plurality of predictive communication frequency classifications comprises at least two of the following frequency classifications: unlimited, none, daily, weekly, biweekly, monthly, semi-monthly, bimonthly, annually, semi-annually, and combinations thereof.

7. The computing system-implemented method of claim 1, further comprising:

using the computing system, retrieving from the one or more data storage devices, for each communication of the plurality of communications, a selected communication sequence, of a plurality of communication sequences, determined using at least one at least one predominant predictive communication sequencing classification of a plurality of predictive communication sequencing classifications; and using the computing system, for each communication of the plurality of communications, automatically generating the communication using the selected communication sequence for the selected individual of the first, second and third groups of individuals.

8. The computing system-implemented method of claim 1, wherein the plurality of predictive identification classifications designate the plurality of entities according to a selected property derived from at least one of the following: attitudinal characteristics, behavioral characteristics, demographic characteristics, geographic characteristics, financial characteristics, or transactional characteristics.

9. A computing system for automatically generating a plurality of communications to a selected population of a plurality of entities represented in a data repository, the system comprising:
one or more data storage devices storing one or more data repositories having, represented in the one or more data repositories, an identification of a selected population to receive a plurality of communications; a plurality of message content versions; an identification of a first group of individuals of the selected population comprising individuals having at least one core predictive identification classification, of a plurality of predictive identification classifications, having a comparatively greater penetration index and having a comparatively greater proportion of the selected population; an identification of a second group of individuals of the selected population comprising individuals having at least one niche predictive identification classification, of the plurality of predictive identification classifications, having a comparatively greater penetration index and having a comparatively lesser proportion of a reference population;
and an identification of a third group of individuals of the selected population comprising individuals having at least one growth predictive identification classification, of the plurality of predictive identification classifications, having a comparatively lesser penetration index and having a comparatively greater proportion of the reference population; and, for each communication of the plurality of communications, a selected communication timing, of a plurality of communication timings;
one or more processors coupled to the one or more data storage devices, the one or more processors adapted to automatically generate a plurality of first communications, of the plurality of communications, to the first group of, the plurality of first communications having at least one first message content version of the plurality of message content versions; to automatically generate a plurality of second communications, of the plurality of communications, to the second group of individuals, the plurality of second communications having at least one second message content version of the plurality of message content versions, the second group of individuals different from the first group of individuals and the at least one second message content version different from the at least one first message content version; and to automatically generate a plurality of third communications, of the plurality of communications, to the third group of individuals, the plurality of third communications having at least one third message content version of the plurality of message content versions, the third group of individuals different from the first and second groups of individuals and the at least one third message content version different from the at least one first and at least one second message content versions; and
one or more application servers coupled to the one or more processors and adapted to automatically transmit the communication electronically according to the selected communication timing, for each communication of the plurality of first communications, and for the selected individual of the first, second and third groups of individuals.

10. The computing system of claim 9, wherein the one or more processors are further adapted, for each communication of the plurality of communications, to automatically generate the communication using a selected communication medium, of a plurality of communication media, determined from at least one predominant predictive communication media classification of a plurality of predictive communication media classifications, for the selected individual of the first, second and third groups of individuals.

11. The computing system of claim 10, wherein the plurality of predictive communication media classifications are represented in the one or more data repositories stored in the one or more data storage devices and comprise at least two of the following: electronic mail (email), telecommunication, radio, television, internet, satellite, cable media, video media, and combinations thereof.

12. The computing system of claim 9, wherein the selected communication timing is determined from at least one at least one predominant predictive communication timing classification of a plurality of predictive communication timing classifications, for the selected individual of the first, second and third groups of individuals.

13. The computing system of claim 12, wherein the plurality of predictive communication timing classifications are represented in the one or more data repositories stored in the one or more data storage devices and comprise at least two of the following communication timing classifications: any time, morning, afternoon, evening, night, weekday, weekend, and combinations thereof.

14. The computing system of claim 9, wherein the one or more processors are further adapted, for each communication of the plurality of communications, to automatically generate the communication using a selected communication frequency, of a plurality of communication frequencies, determined from at least one at least one predominant predictive communication frequency classification of a plurality of predictive communication frequency classifications, for the selected individual of the first, second and third groups of individuals.

15. The computing system of claim 14, wherein the plurality of predictive communication frequency classifications are represented in the one or more data repositories stored in the one or more data storage devices and comprise at least two of the following frequency classifications: unlimited, none, daily, weekly, biweekly, monthly, semi-monthly, bimonthly, annually, semi-annually, and combinations thereof.

16. The computing system of claim 9, wherein the one or more processors are further adapted, for each communication of the plurality of communications, to automatically generate the communication using a selected communication sequence, of a plurality of communication sequences represented in the one or more data repositories stored in the one or more data storage devices, the selected communication sequence determined from at least one at least one predominant predictive communication sequencing classification of a plurality of predictive communication sequencing classifications, for the selected individual of the first, second and third groups of individuals.

17. The computing system of claim 9, wherein the plurality of predictive identification classifications designate the plurality of entities according to a selected property derived from at least one of the following: attitudinal characteristics, behavioral characteristics, demographic characteristics, geographic characteristics, financial characteristics, or transactional characteristics.

* * * * *